US008027473B2

(12) United States Patent
Stiscia et al.

(10) Patent No.: US 8,027,473 B2
(45) Date of Patent: Sep. 27, 2011

(54) SYSTEM AND METHOD FOR IMPROVED DATA PROTECTION IN PONS

(75) Inventors: James Stiscia, Garner, NC (US); Raymond Chen, Raleigh, NC (US)

(73) Assignee: Conexant Systems, Inc., Newport Beach, CA (US)

( * ) Notice: Subject to any disclaimer, the term of this patent is extended or adjusted under 35 U.S.C. 154(b) by 1211 days.

(21) Appl. No.: 10/340,651

(22) Filed: Jan. 13, 2003

(65) Prior Publication Data
US 2004/0136534 A1    Jul. 15, 2004

(51) Int. Cl.
*H04K 1/00* (2006.01)
(52) U.S. Cl. ......... 380/256; 380/255; 380/265; 370/397
(58) Field of Classification Search .............. 380/54, 380/256, 255, 265; 713/162; 370/397
See application file for complete search history.

(56) References Cited

U.S. PATENT DOCUMENTS

| 5,473,696 | A * | 12/1995 | van Breemen et al. ....... 713/162 |
| 5,793,871 | A * | 8/1998 | Jackson ........................... 380/54 |
| 6,671,260 | B1 * | 12/2003 | Engstrand ..................... 370/238 |
| 6,848,053 | B1 * | 1/2005 | Monzawa et al. .............. 726/18 |
| 2002/0015494 | A1 * | 2/2002 | Nagai et al. ................... 380/201 |
| 2002/0071562 | A1 * | 6/2002 | Parenty .......................... 380/278 |
| 2002/0087709 | A1 * | 7/2002 | Kerr et al. ...................... 709/231 |
| 2002/0162114 | A1 * | 10/2002 | Bisher et al. ................... 725/91 |
| 2004/0136372 | A1 * | 7/2004 | Gruia ............................. 370/390 |
| 2004/0202174 | A1 * | 10/2004 | Kim et al. ................... 370/395.1 |

OTHER PUBLICATIONS

David Greenfield, "Passive Optical Networks," Network Magazine, Dec. 5, 2001, 5 pages, accessed at <http://www.networkmagazine.com/article/printableArticle?doc_id=NMG20011203S0021>.
Junko Yoshida and Craig Matsumoto, "Alcatel fields PON to deliver triple play of services," EE Times, Jan. 3, 2002, 4 pages, accessed at <http://www.eetimes.com/story/OEG20011130S0089>.
Mark Klimek, "ATM passive optical network," Alcatel Telecommunications Review—4th Quarter 2000, Oct. 1, 2000, pp. 258-261, accessed at <http://www.alcatel.com/doctypes/articlepaperlibrary/pdf/ATR2000Q4/gb/07klimgb.pdf>.
ITU-T Recommendation G.983.1, "Broadband optical access systems based on Passive Optical Networks (PON)," Oct. 1998, 69 pages.

* cited by examiner

*Primary Examiner* — Christian LaForgia
*Assistant Examiner* — Roderick Tolentino
(74) *Attorney, Agent, or Firm* — Jackson Walker L.L.P.; Christopher J. Rourk

(57) ABSTRACT

Mechanisms for providing a subscriber-side interface with a passive optical network are described herein. An optical network termination (ONT) having an integrated broadband passive optical network processor is utilized to receive downstream data from an optical line termination (OLT) via a passive optical network and provide the contents of the downstream data to one or more subscriber devices via one or more data interfaces. Similarly, the ONT is adapted to receive and transmit upstream data from the one or more subscriber devices to the OLT via the passive optical network. The ONT preferably implements one or more encryption/decryption mechanisms, such as the digital encryption standard (DES), to provide data protection in addition to, or in place of, data churning provided for by the ITU G.983 recommendations.

27 Claims, 8 Drawing Sheets

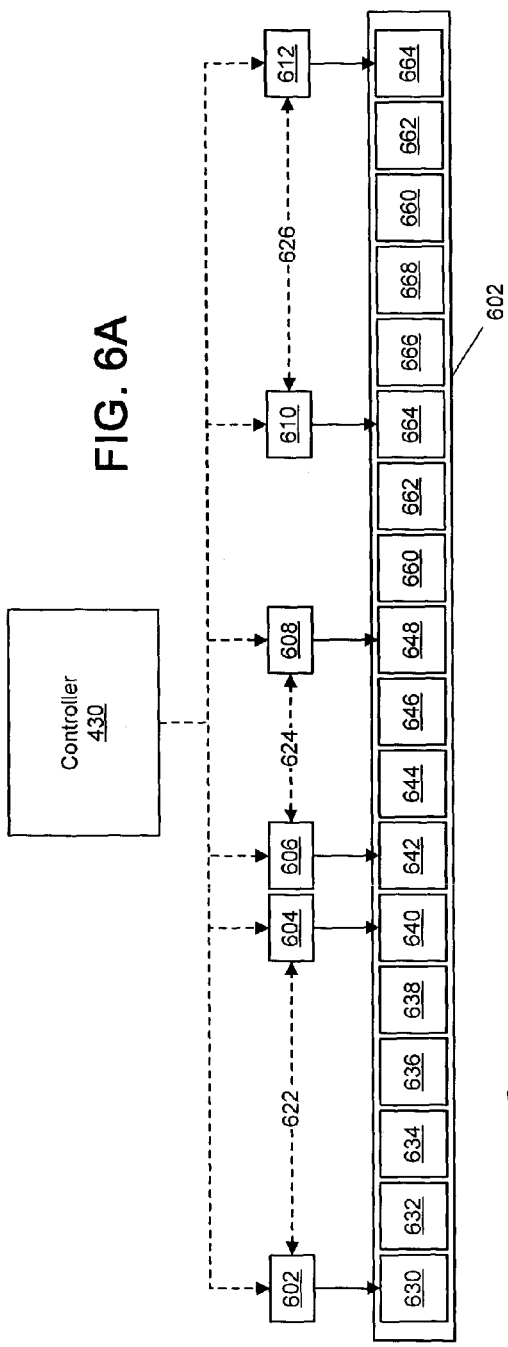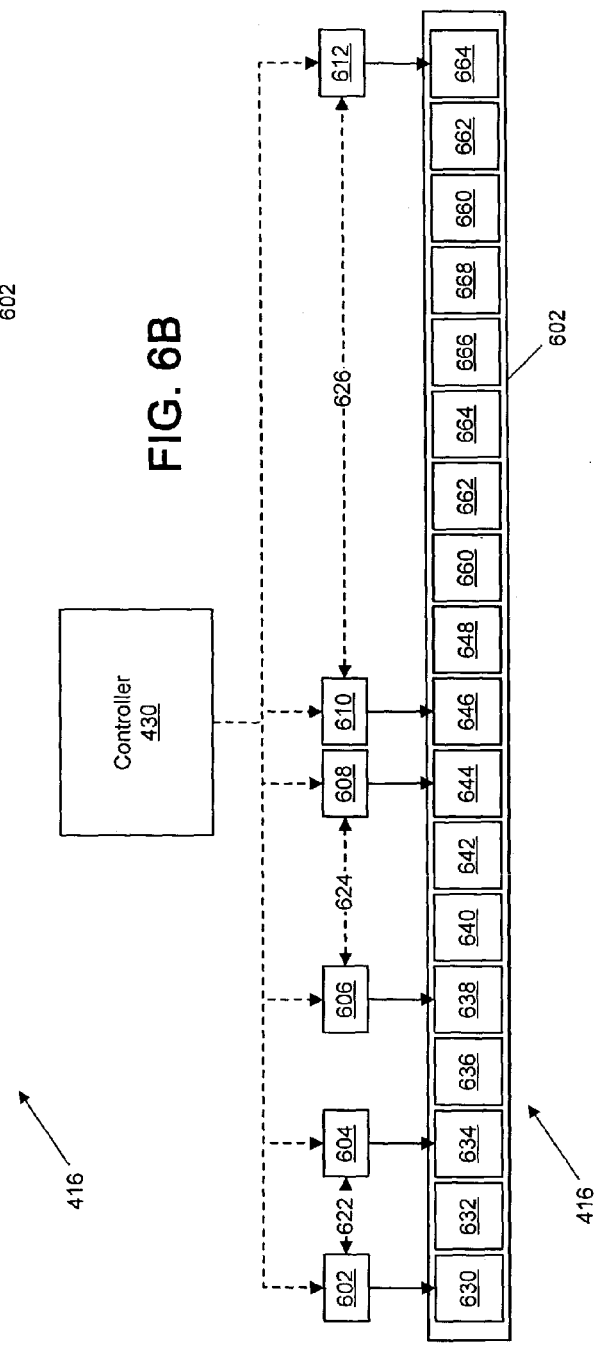

SYSTEM AND METHOD FOR IMPROVED DATA PROTECTION IN PONS

FIELD OF THE INVENTION

The present invention relates generally to communication using broadband passive optical networks and more particularly to securing data transmitted in passive optical networks.

BACKGROUND OF THE INVENTION

A number of network technologies have been developed for connecting the so-called "last mile" between a central office and subscriber. One such development is the passive optical network (PON). PONs typically include a fiber optic network between a central office (CO) and a subscriber comprising active network devices only at the CO and at the subscriber premises. As such, PONs generally require less power to operate, are more reliant, and can be upgraded without having to upgrade the plant between the CO and the subscriber.

PONs often are used to provide multiple types of data content, such as voice, data, and video, over the same network. To properly distribute this content, a number of common network protocols, such as Ethernet and Asynchronous Transfer Mode (ATM), are used to deliver the content over the PON. ATM PONs, or APONs, are particularly well suited for delivering real-time content, such as voice or videoconferencing, due to Quality of Service (QoS), small cell size, and other features incorporated by the ATM protocol. A specification for APONs has been adopted by the International Telecommunication Union (ITU) as Recommendations G.983.1, G.983.2, G.983.3, G.983.4, and G.983.5 (collectively known herein as the ITU G.983.X Recommendation). These recommendations address APON systems with symmetrical line rates of 155.520 Mbps and asymmetrical line rates of 155.520 Mbps upstream and 622.080 Mbps downstream. The recommendations also cover the physical layer requirements and specifications for the physical media dependent layer for an APON range up to 20 km (12.4 miles), the trans-convergence (TC) layer, security, and a ranging protocol. Additionally, dynamic bandwidth allocation (DBA) and data protection mechanisms are outlined.

Referring now to FIG. 1, an exemplary implementation of a known PON is illustrated. The known system 100 includes a central office 104 having an optical line termination (OLT) 110 connected to a number of optical network terminations (ONTs) 130-134 via a PON 120. Data, video, and/or voice content from various content providers is delivered to the OLT 110 of the CO 104. The OLT 110 typically is a component of an access multiplexer shelf that terminates the optical network in the CO 104. It receives and transmits APON optical signals via a fiber management shelf utilized to route between access multiplexer shelves and the outside fiber plant (PON 120). An optical module of the OLT 110 performs optical filtering, electronic-to-optical (E/O) conversion, and optical-to-electrical (O/E) conversion. The upstream data (i.e., from the subscriber devices to a content provider via the OLT 110) is de-framed, OAM extracted, and upstream data multiplexed with other upstream data before being sent to a back plane bus interface, such as a Utopia Optical Connection Level 3 (OC3) physical interface. The back plane upstream bus interface, by means of a vendor specific method (dedicated pipe, shared structure with share/grant mechanisms, etc.) sends the data to the network interface connected to the one or more content servers.

Conversely, downstream data (i.e., from the content server to the subscriber devices via the OLT 110 and an ONT) is routed to the OLT 110 by means of a vendor specific interface method (dedicated pipe, shared structure with share/grant mechanisms, etc.) from the network termination through the back plane bus interface to the APON interface of the OLT 110 (such as by a Utopia OC3 or OC Layer 12 (OC 12) physical interface). The downstream data is placed into the appropriate data slot assigned to the intended ONT of the ONTs 130-134. OAM is added to the data, the data is framed, and then sent to the optical transmitter of the OLT 110. This ATM downstream data is encrypted by the APON interface utilizing a key received from each ONT 130-134 specifically for each ONT's own data stream. In addition to the data interfacing function, the back plane bus may contain a separate management interface for equipment inventory & management, facilities management of ONT services, permanent virtual circuit (PVC) assignment, virtual circuit (VC)/virtual path (VP) cross connection management, alarm surveillance, etc.

The ONTs 130-134 are the components that terminate the optical link of the PON 120 at the customer premises. For example, the ONT 130 terminates outside of the subscriber premises 150, where the ONT 130 can be used to: provide voice content (e.g., VoIP) to/from one or more telephones 152 via a RJ11 twisted pair line; provide network data (such as Internet content) to one or more computers 154 over an Ethernet network; and provide video (either analog or digital) to one or more televisions 156. The ONTs 130-134 typically include an optical module that performs optical filtering, E/O conversion, O/E conversion, and downstream clock recovery. Downstream data received from the OLT 110 is de-framed, OAM extracted, and processed according to its content and/or destination (voice, network data, video) by the APON interface 140. For example, downstream voice content is provided to a telephone 152 (one example of a subscriber device) via a voice interface 142, downstream video content is provided to a video display 156 (another example of a subscriber device) via a video interface 146, and data content, such as data from a server on the Internet, is provided to a computer 154 (yet another example of a subscriber device) via the data interface 144. Upstream data from subscriber devices intended for the CO 104 is collected from the interfaces 142-146, multiplexed into a data stream, framed, and OAM inserted before being sent to an optical transmitter of the ONT 130. The transmitter data is adjusted into its proper system time slot by the APON interface 140 by offsetting its transmit data clock (by an amount determined by the ranging protocol) relative to the downstream clock.

While the use of optical network terminations (ONTs), also known as network interface devices (NIDs) or optical network units (ONUs), in passive optical networks provides a great deal of flexibility in data content, data transmission rates, and other design considerations, known ONTs have a number of limitations. For one, known ONTs typically implement the functionality of the APON interface 140 and the subscriber interfaces 142-146 as discrete devices often connected via a printed circuit board. However, the implementation of separate devices for the APON interface 140 and the subscriber interface 142-146 exhibits numerous disadvantages. For one, the use of separate devices on a PCB limits the reduction of the size of the ONT. Additionally, utilizing separate devices to provide PON processing functionality results in unnecessarily high power consumption, as the interfaces between the devices results in power loss due to parasitic capacitance, current leak, poorly controlled interfaces between the devices, and the like. Likewise, the signal loops on the PCB and the interconnects produce a relatively large amount of electromagnetic interference (EMI) which can interfere with the operation of the ONT. Similarly, the connections between devices and PCBs and the traces between the devices of the PCB often are somewhat unreliable, so by implementing a relatively large number of devices to provide PON processing functionality, the reliability of the ONT can be compromised. Another limitation is resource duplication between the devices, since each device often implements some common functionalities, such as memory, memory access controllers, registers, and the like. Additionally, by using numerous discrete components to implement the PON processing capability of the ONT, ONT manufacturers often must keep large inventories of the individual devices on hand.

In addition to the limitations of the physical structure of known ONTs, PON standards, such as the ITU G.983.X Recommendation, are deficient in a number of areas. For example, the ITU G.983.X Recommendation provides for a rudimentary data protection method referred to as "churning." However, the churning key used in accordance with the G.983.X Recommendation is only 24 bits long, a key length that is recognized by those skilled in the art as relatively weak. Additionally, although the G.983.X Recommendation makes provision for the dynamic allocation of bandwidth between the OLT and the ONTs, it is incumbent on the OLT to analyze the data transfer status between the OLT and the ONTs in order to modify the bandwidth allocations.

In view of the limitations of known optical network termination implementations, improved mechanisms for providing passive optical network connectivity to subscribers would be advantageous.

SUMMARY OF THE INVENTION

The disclosed technique mitigates or solves the above-identified limitations in known implementations, as well as other unspecified deficiencies in the known implementations.

In an optical network termination in optical communication with an optical line termination and operably coupled to at least one subscriber device, a security module is provided in accordance with one embodiment of the present invention. The security module comprises a dechurner module being adapted to dechurn a portion of downstream data received from the optical line termination, and a decryption engine in electrical communication with the dechurner module and being adapted to decrypt the dechurned portion of the downstream data.

In an optical network termination in optical communication with an optical line termination and operably coupled to at least one subscriber device, a security module is provided in accordance with another embodiment of the present invention. The security module comprises a decryption engine adapted to decrypt a portion of downstream data received from the optical line termination and a dechurner module in electrical communication with the decryption module and being adapted to dechurn the decrypted portion of the downstream data.

In an optical network termination in optical communication with an optical line termination and operably coupled to at least one subscriber device, a method is provided in accordance with yet another embodiment of the present invention. The method comprises the steps of decrypting an encrypted, churned portion of downstream data from the optical line termination using a decryption algorithm, and dechurning the decrypted portion of the downstream data from the optical line termination.

In an optical network termination in optical communication with an optical line termination and operably coupled to at least one subscriber device, a method is provided in accordance with an additional embodiment of the present invention. The method comprises the steps of dechurning an encrypted, churned portion of downstream data from the optical line termination and decrypting the dechurned portion of the downstream data using a decryption algorithm.

In accordance with another embodiment of the present invention, system is provided. The system comprises an optical line termination being adapted to transmit, via a passive optical network, downstream data, wherein at least a portion of the downstream data is encrypted and churned and an optical network termination in optical communication with the optical line termination via the passive optical network. The optical network termination is adapted to dechurn the portion of downstream data and decrypt the portion of downstream data.

In an optical network termination in optical communication with an optical line termination and operably coupled to at least one subscriber device, a computer readable medium is provided in accordance with yet another embodiment of the present invention. The computer readable medium comprising a set of instructions being adapted to manipulate a processor to decrypt an encrypted, churned portion of downstream data from the optical line termination using a decryption algorithm and dechurn the decrypted portion of the downstream data from the optical line termination.

In an optical network termination in optical communication with an optical line termination and operably coupled to at least one subscriber device, a computer readable medium is provided in accordance with an additional embodiment of the present invention. The computer readable medium comprising a set of instructions being adapted to manipulate a processor to dechurn an encrypted, churned portion of downstream data from the optical line termination and decrypt the dechurned portion of the downstream data using a decryption algorithm.

Various embodiments of the present invention provide an integrated PON/Voice/Communications processor in accordance with the ITU G.983.X Recommendation. The implementation methods and level of integration can be chosen to minimize cost and optimize performance of a broadband passive optical network termination (ONT) device. One objective of the present invention is to reduce the development cost of an ONT. Another objective includes reducing net power consumption for the aggregate functionality required for broadband voice, video, and data service. Yet another objective is to provide a scaleable and flexible PON optics interface capable of multiple symmetric/asymmetric configurations. An additional objective of the present invention is to provide scaleable upstream and downstream burst buffering to allow real time bandwidth control/allocation (minimize cell loss ratio versus load, delay versus system load) across the PON. The present invention finds particular beneficial implementation in the FTTB (Fiber to the Business) and FTTH (Fiber to the Home) markets.

In at least one embodiment of the present invention, the functionality of PON processing, ATM processing, video processing (e.g., digital cable), voice processing (e.g., VoATM or VoIP), and data network (e.g., Ethernet) processing is integrated onto into a single integrated circuit, thereby providing an integrated device that can be used to interface between a subscriber and an optical network. A subscriber plain old telephone system (POTS) service (one or multiple lines), private branch exchange (PBX) service, or an international public switched telephone network (ISPTN) service can be provided by on-chip voice processing which is capable of providing voice coding, echo cancellation, tone detection, tone generation, and fax. The customer data service is provided via a data interface, such as a 10/100 Base-T interface or through an MII interface connected to another PHY device such as an IEEE 802.11b interface, a Home Phoneline Network Alliance (HPNA) compliant interface, and the like. ATM processing provides for switching and Layer 2,3 functionality required between the subscriber devices and data network. PON processing provides for the physical layer framing, OAM, messaging, dynamic bandwidth allocation, and decryption of data toward the consumer.

By integrating the described functionality onto a single chip, the following advantages may be realized: lower ONT power consumption as interfaces between multiple processors can be better controlled; memory resource sharing among multiple processors reduces power consumption, reduces resource duplication and reduces total system cost; lower electromagnetic interference (EMI) levels as signal loop areas are reduced since fewer high signal level interfaces and interconnects are required; higher reliability as fewer components and less PCB area are required; improved system diagnostics capability as functions such as self tests and loop backs can be easily included and controlled; and ONT suppliers can stock less overall component inventory per ONT.

Still further features and advantages of the present invention are identified in the ensuing description, with reference to the drawings identified below.

BRIEF DESCRIPTION OF THE DRAWINGS

The purposes and advantages of the present invention will be apparent to those of ordinary skill in the art from the following detailed description in conjunction with the appended drawings in which like reference characters are used to indicate like elements, and in which:

FIGS. 6A and 6B are schematic diagrams illustrating an exemplary implementation of a burst buffer of the APON interface of FIG. 4 in accordance with at least one embodiment of the present invention.

DETAILED DESCRIPTION OF THE PREFERRED EMBODIMENTS

Figure 1:
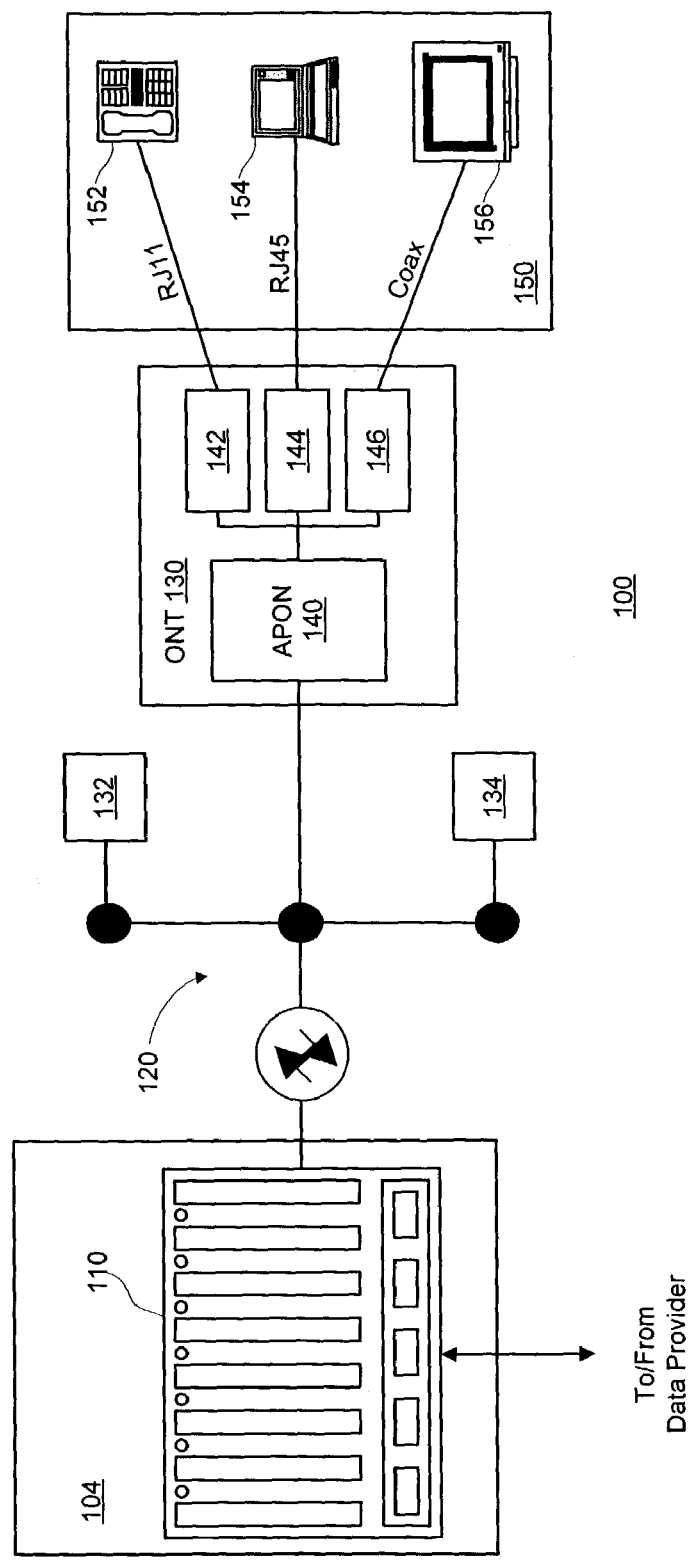
FIG. 1 is a schematic diagram illustrating a known passive optical network implementation.

In the interest of brevity, a number of acronyms, initialisms, and abbreviations may be used in the following discussion. To provide a useful reference, these terms and their corresponding representation are listed below:

| | |
|---|---|
| ADSL | Asymmetric Digital Subscriber Line |
| APON | ATM Over Passive Optical Network |
| ATM | Asynchronous Transfer Mode |
| BER | Bit Error Rate |
| BFP | Back Facet Photodiode |
| BIP | Byte Interleaved Parity |
| BM LDR | Burst Mode Laser Driver |
| PON | Broadband Over Passive Optical Network |
| CATV | Coaxial Cable Television |
| CLEC | Competitive Local Exchange Carrier |
| CO | Central Office |
| CM AGC | Continuous Mode Automatic Gain Control |
| CM CDR | Continuous Mode Clock & Data Recovery |
| CM TIA | Continuous Mode Trans-Impedance Amplifier |
| CRC | Cyclic Redundancy Check |
| DBA | Dynamic Bandwidth Allocation |
| DFB | Distributed Feedback Laser |
| DS | Downstream |
| DSL | Digital Subscriber Line |
| DWDM | Dense Wavelength Division Multiplexing |
| EMI | Electro-Magnetic Interference |
| EMS | Element Management System |
| E/O | Electrical to Optical |
| EPB | Extended Peripheral Bus |
| EPON | Ethernet Over Passive Optical Network |
| FEC | Forward Error Correction |
| FP-LD | Fabry-Perot Laser Diode |
| FSAN | Full Service Access Network |
| FTTB | Fiber to the Business |
| FTTC | Fiber to the Cabinet |
| FTTH | Fiber to the Home |
| GPIO | General Purpose Input/Output |
| HEC | Header Error Control |
| IEEE | Institute of Electrical and Electronics Engineers |
| ILEC | Incumbent Local Exchange Carrier |
| ITU | International Telecommunications Union |
| IP | Internet Protocol |
| LAN | Local Area Network |
| LCD | Loss of Cell Delineation |
| LCP | Local Convergence Point |
| LCF | Laser Control Field |
| LD | Laser Diode |
| LSB | Least Significant Bit |
| LT | Line Terminal |
| LVDS | Low Voltage Differential Signaling |
| MAC | Media Access Control |
| MAN | Metropolitan Access Network |
| MII | Media Independent Interface |
| MPEG 2 | Motion Picture Experts Group- Layer 2 |
| MSB | Most Significant Bit |
| MSO | Cable Multiple-System Operator |
| NAP | Network Access Point |
| NRZ | Non Return to Zero |
| NT | Network Termination |
| O/E | Optical to Electrical Conversion |
| OAM | Operations, Administration and Maintenance |
| OAN | Optical Access Network |
| ODF | Optical Distribution Frame |
| ODN | Optical Distribution Network |
| OLT | Optical Line Termination |
| ONT | Optical Network Termination |
| ONU | Optical Network Unit |
| P2P | Point to Point |
| P2MP | Point to Multi-Point |
| PCB | Printed Circuit Board |
| PHY | Physical Layer |
| PLOAM | Physical Layer Operations, Administration and Maintenance |
| PON | Passive Optical Unit |
| POP | Point of Presence |
| POTS | Plain Old Telephone Service |
| PRBS | Pseudo-Random Bit Sequence |
| PSTN | Public Switched Telephone Network |
| QoS | Quality of Service |
| RFI | Radio Frequency Interference |
| RT | Remote Terminal |

| | |
|---|---|
| Rx | Receiver |
| RXCF | Receiver Control Field |
| SLA | Service Level Agreement |
| SLIC | Subscriber Line Interface Chip |
| SONET | Synchronous Optical Network |
| TC | Transmission Convergence |
| TDM | Time Division Multiplex |
| Tx | Transmitter |
| UNI | User Network Interface |
| US | Upstream |
| VC | Virtual Channel |
| VOATM | Voice Over Asynchronous Transfer Mode |
| VOD | Video On Demand |
| VOIP | Voice Over Internet Protocol |
| VP | Virtual Path |
| VPI | Virtual Path Identifier |
| VPN | Virtual Private Network |
| WAN | Wide Area Network |
| WDM | Wavelength Division Multiplexing |

FIGS. 2-8 illustrate mechanisms for providing a subscriber-side interface with a passive optical network. In at least one embodiment, an ONT having an integrated PON processor is utilized to receive downstream data from an OLT via a passive optical network and provide the contents of the downstream data to one or more subscriber devices. Similarly, the ONT is adapted to receive and transmit upstream data from the one or more subscriber devices to the OLT via the passive optical network. Additionally, the ONT can implement a burst buffer for buffering upstream and/or downstream data. In one embodiment, the ONT is adapted to provide OLT notification of the burst buffer, thereby allowing the OLT to modify the bandwidth allocations. Additionally, in one embodiment, the ONT implements one or more encryption/decryption mechanisms, such as the digital encryption standard (DES), Triple DES (3DES), and Advanced Encryption Standard (AES), to provide data protection in excess of, or in place of, data churning provided for in the ITU G.983 recommendations. The ONT can be adapted to interface with any of a variety of PONs, such as, for example, an ATM PON (APON) or an Ethernet PON (EPON). Further, the ONT can be adapted to transmit and/or receive information using a variety of network protocols and protocol combinations. To illustrate, the ONT could be adapted for transmission/reception of Voice over ATM (VoATM), Ethernet over ATM, video encapsulation, and the like. Likewise, the data transmitted can include data of a variety of different formats, such as voice data, video data, file data, and the like. For illustrative purposes, an exemplary implementation of the PON processor 240 using an APON interface for use in an APON is discussed below. However, those skilled in the art can implement, using the guidelines provided herein, alternate PON interfaces, such as an EPON interfaces to an EPON, without departing from the spirit or the scope of the present invention.

Figure 2:
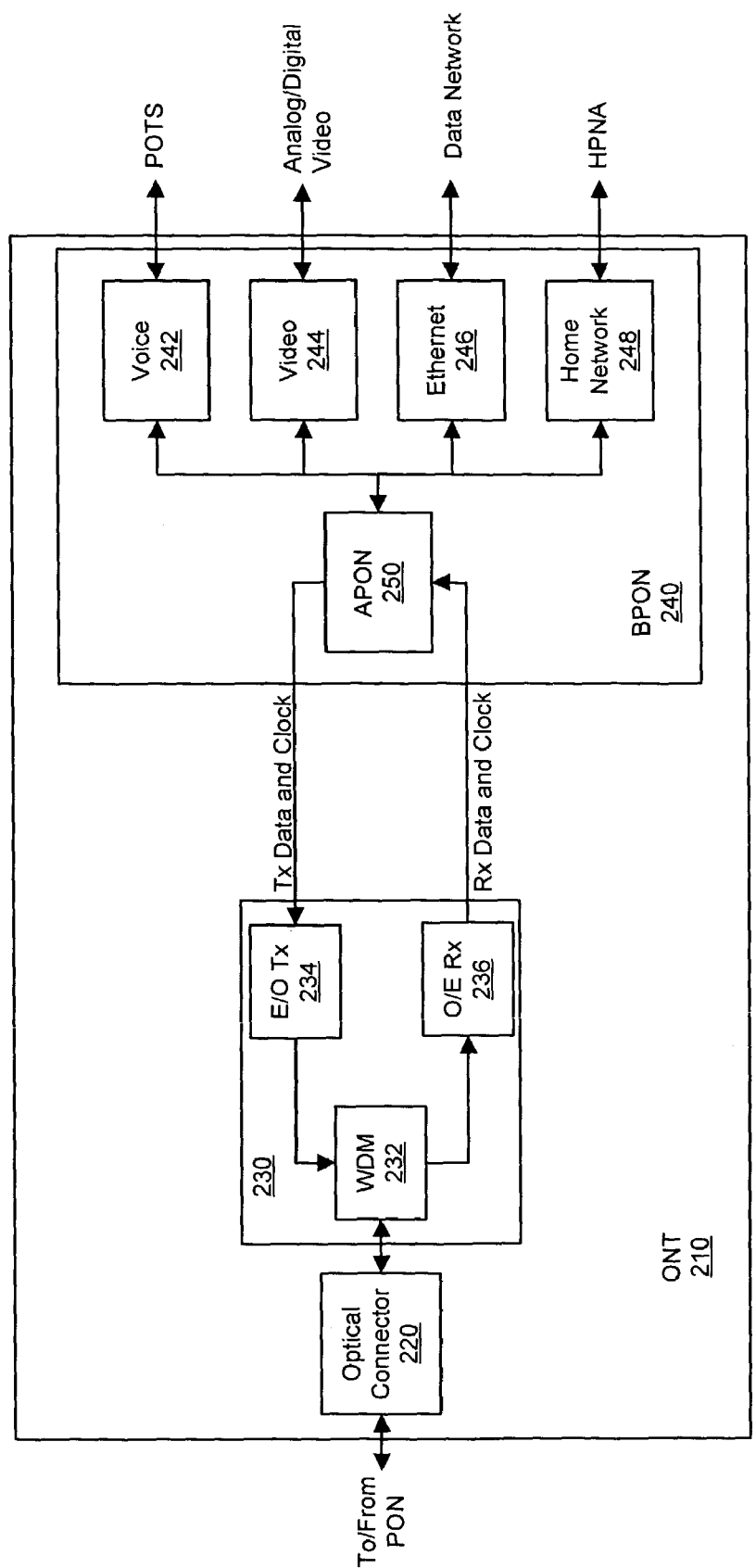
FIG. 2 is a schematic diagram illustrating an exemplary implementation of an ONT having an integrated PON processor in accordance with at least one embodiment of the present invention.

Referring now to FIG. 2, an exemplary ONT 210 having an integrated PON processor is illustrated in accordance with the present invention. ONTs in accordance with at least one embodiment of the present invention, such as ONT 210, utilize an integrated PON processor 240 having both PON interfacing functionality and one or more subscriber device interfaces implemented on a single integrated circuit or device, such as an application specific integrated circuit (ASIC), a microcontroller, a programmable logic device (PLD), and the like. The APON interface 250 and data interfaces 242-248 of the PON processor 240 are exemplary and illustrate a logical segmentation of the functionality provided by the PON processor 240 and are not intended to imply a specific physical separation of components within the integrated circuit of the PON processor 240.

In the illustrated embodiment, optical signals representative of downstream data are transmitted via a PON, such as PON 120 of FIG. 1, to the optical connector 220, wherein the optical connector 220 serves as a coupling device to the optical fiber of the PON 120. The optical connector 220 provides the optical signals to the optical module 230, wherein a wavelength division multiplexing (WDM) module 232 filters the optical signal and provides the filtered signal to an optical-to-electrical (O/E) converter 236. The O/E converter 236 converts the filtered optical signal into its digital equivalent and then provides the digital data representative of the filtered signal to the APON interface 250. The APON interface 250, in one embodiment, processes upstream and downstream data in accordance with one or more of the ITU G.983.X Recommendations. Such processes can include APON framing/deframing, OAM extraction/insertion & OAM messaging, and ranging/upstream time slot synchronization. For downstream data, the APON interface 250, in one embodiment, deframes the downstream data to identify and extract asynchronous transfer mode (ATM) cells and physical layer OAM (PLOAM) cells from the downstream data. The downstream ATM cells or their payloads then are provided to one or more of the interfaces 242-248 for any additional processing and subsequent output to one or more subscriber devices. The extracted PLOAM cells can be used by the APON interface 250 for management and configuration purposes.

Any of a variety of data interfaces may be utilized in accordance with the present invention. As illustrated in FIG. 2, in one embodiment, the data interfaces that can be implemented by the integrated PON processor include a voice interface 242, a video interface 244, and network data interfaces 246, 248. The voice interface 242, in one embodiment, is adapted to decode voice content data from the APON interface 250 and provide the resulting electrical signal representative of the voice content to one or more telephony devices over a telephone network, such as a POTS, a PBX, or a IPSTN. Additionally, the voice interface 242 can be further adapted to provide one or more of the following: voice coding, echo cancellation, tone detection and generation, and fax and data functionality.

Network data content, such as data from a server on the Internet, is provided to one or more network data interfaces 246, 248 depending on its destination. Data content at the network data interface is de-encapsulated and re-encapsulated by the network data interface, if necessary, to conform to the protocol used by a data network to which the network data interface is connected. After any necessary manipulation, the data interface transfers the data content over the data network to one or more subscriber devices, such as a personal computer or handheld device. The network data interfaces 246, 248 can include any of a variety of network data interfaces, such as an Ethernet interface, a token ring interface, an ATM interface, an IEEE 802.11b interface, a Home Phoneline Network Alliance (HPNA) 2.0 interface, and the like.

For example, in one embodiment, the network data interface 246 includes an Ethernet interface for sending and receiving data from one or more computers connected to the ONT 210 via an Ethernet network and the network data interface 248 includes a HPNA 2.0 compliant interface. In this example, the APON interface 250 extracts ATM cells from the downstream data that are intended for a subscriber device on the Ethernet network and provides the ATM cells to the Ethernet interface (network data interface 246). The Ethernet interface then de-encapsulates the ATM cells to obtain their data payload and then re-encapsulates the data payloads into Ethernet frames. The Ethernet interface then transmits the Ethernet frames over the Ethernet network to the subscriber device. Similarly, ATM cells intended for a home phoneline network connected to the HPNA interface (network data interface 248) can be de-encapsulated and their payloads are re-encapsulated into HPNA-compliant frames and the frames then can be transmitted to the destination subscriber device on the home phoneline network.

Video content provided to the video interface 244 from the APON interface 240 is processed/converted as necessary and the results are provided to one or more video displays on a video network connected to the video interface 244. For example, the downstream data could include video content data from a videoconference. In this case, the downstream video content from an OLT can be transmitted in digital form to the APON interface 250, whereupon the APON interface 250 provides the video content data to the video interface 244. The video interface 244, in this example, then converts the digital data representing the video content into an NTSC-compliant analog electrical signal representative of the video content. The video interface 244 can be adapted to implement one or more of the following: Motion Pictures Experts Group (MPEG) decoding; MPEG encoding; audio & video stream delay synchronization; re-modulation to create multiple analog video channels; and the like. Additionally, in at least one embodiment, the video interface 244 is adapted to support one or more digital video formats, such as High Definition Television (HDTV).

Conversely, upstream data from the customer is received at the interfaces 242-248, manipulated as necessary, and then provided to the APON interface 250. The APON interface 250 multiplexes the separate contents together, as appropriate, and then provides the multiplexed upstream data the optical module 230 for transmission to the OLT via the PON. Data received at the voice interface 242, in one embodiment, is encoded and converted into upstream ATM cells, and the ATM cells are provided to the APON interface 250 for upstream transmission. Alternatively, the APON interface 250 can be adapted to frame the data from the voice interface 242 into ATM cells and then provide the ATM cells to the optical module 230 for transmission to the OLT. Likewise, the video interface 244 could be adapted to support interactive video and any input received via the video interface 244 from a video display can be encoded as necessary and provided to the APON interface 250. Data, in the form of frames, packets, cells, and the like, is received at the network data interfaces 246, 248 and de-encapsulated/re-encapsulated (as appropriate) into ATM cells that are provided to the APON interface 250.

The APON interface 250, upon receipt of ATM cells from the interfaces 242-248, processes the upstream ATM cells in accordance with one or more of the ITU G.983.X Recommendations. This processing can include insertion of OAM, data payload scrambling, adding APON overhead bytes, framing, and the like. The upstream data is provided from the APON interface 250 to the electrical-to-optical (E/O) converter 234, wherein the upstream data is converted from an electrical signal to an optical signal. The WDM module 232 filters the optical signal and provides the optical signal to the optical connector 220, wherein the optical signal representative of the upstream data is transmitted over the PON to the upstream OLT (such as OLT 110 of FIG. 1).

Figure 3:
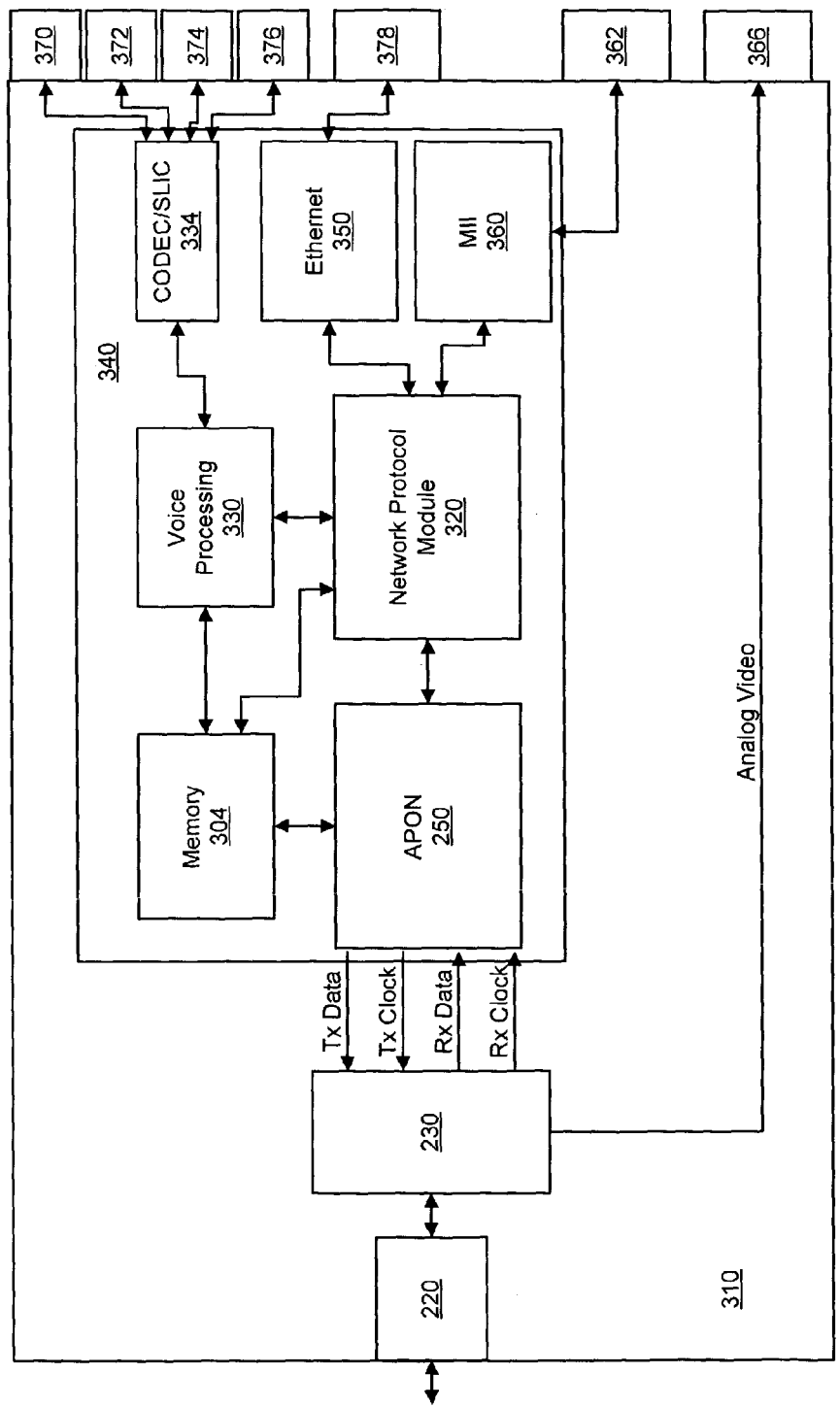
FIG. 3 is a schematic diagram illustrating another exemplary implementation of an ONT in accordance with at least one embodiment of the present invention.

Referring now to FIG. 3, an exemplary implementation of an ONT 310 having an integrated PON processor 340 is illustrated in accordance with at least one embodiment of the present invention. In the illustrated embodiment, the ONT 310 includes an optical connector 220, an optical module 230, an integrated PON processor 340, an alternate interface 362, and physical ports 366, 370-378. As discussed with reference to FIG. 2, the optical connector 220 is used to transmit optical signals from the optical module 230 to an OLT via a PON, such as PON 120 of FIG. 1, and provide optical signals transmitted by the OLT via the PON to the optical module 230. The optical module 230 is adapted to convert the optical signal into electronic signals and vice versa. The optical module 230 also is adapted to provide clock signaling to the PON 340 and to the OLT. Additionally, in at least one embodiment, the optical module 230 is adapted filter the portion of the optical signal representing video content, convert this portion to an analog electrical video signal, and provide the analog video signal to one or more televisions connected to the ONT 310 via a video port 366 (e.g., a coaxial cable connector).

The PON processor 340 (analogous to PON processor 240) includes an integrated circuit having an APON interface 250, a network protocol module 320, a voice processing module 330, memory 304 (SRAM, for example), a coder/decoder (Codec)/SLIC module 334, an Ethernet interface 350, and a Media Independent Interface 360. The voice processing module 330, in one embodiment, includes a digital signal processor adapted for voice processing having a program memory bus, data memory buses, arithmetic logic unit, accumulators (including a multiply accumulator), application specific hardware, on chip memory, and any required peripherals (DMA controller, timers, clock generator). The network protocol module 320, in one embodiment, is a communications module adapted to implement one or more network protocol stacks, such as Telecommunications Protocol/Internet Protocol (TCP/IP), and can include a 10/100 BaseT Ethernet MAC & PHY, MII, an EPB with direct memory access (DMA) support and a 32 bit interface, one or more ARM 9 protocol & network processors with the appropriate RAM caches, an synchronous dynamic random access memory (SDRAM) controller, a DMA controller, power control logic for power saving & clock gating, General Purpose Inputs/Outputs (GPIOs), a network timing recovery capability, shared data cache, a quality-of-service (QOS) engine for cell pacing/traffic shaping hardware assist, and loop back port. The network protocol module 320 can provide the functionality of, for example, a communications processor available under the tradename Helium 210-80 from Conexant, Inc. of Red Bank, N.J.

Downstream data and clock information from the optical module 230 is received by the APON interface 250, whereupon the data is deframed into downstream ATM cells and downstream Physical Layer OAM (PLOAM) cells, as defined by the ITU G.983.X Recommendation. The downstream ATM cells are then dechurned, if appropriate, and provided to the network protocol module 320. The downstream PLOAM cells can be used by the APON interface 250 to control its operation. For example, PLOAM cells can include information used to: control the upstream transmission timing for ONTs on a PON; perform ranging to determine the transmission delay and other relevant information; measure the quality of a transmission; request a churning key from the ONTs; perform miscellaneous control functions; and the like.

At the network protocol module 320, the data payloads of the downstream ATM cells are processed by an appropriate network protocol stack and then routed to one or more voice processing module 330, the Ethernet interface 330, or the MII 360, based on the content type of the ATM cells. Voice content can be routed to the voice processing module 330 for decoding and conversion into an analog signal for transmission to one or more telephone devices over one or more telephone networks connected to telephony ports 370-376. The voice processing module 330, in one embodiment, is adapted to provide a variety of telephony-related functions, including tone generation and removal, tone detection, network echo cancellation, voice encoding/decoding/transcoding, fax/data capabilities, and the like. Likewise, in at least one embodiment, the voice processing module 330 is adapted to support VoIP. The telephony ports 370-376 can include any of a variety of telephony-compatible physical ports, and preferably include RJ-11 ports.

Data content, such as web page data from an HTTP server on the Internet, can be framed into Ethernet frames by the protocol stack of the network protocol module 320 and then routed to the Ethernet interface 350 for output to one or more subscriber devices via a data network connected to the Ethernet port 378. The Ethernet interface 350 can include any of a variety of Ethernet interfaces, such as 10-BaseT, 10-Base5, and the like, and preferably includes a 10/100 Base-T interface. The Ethernet port 378 can include any of a variety of Ethernet-compatible ports, such as an RJ-45 port, a coaxial cable port, and the like. Although FIG. 3 illustrates an exemplary embodiment wherein the network data interface of an integrated PON processor includes an Ethernet interface, other network data interfaces, such as an ATM interface or a fiber distributed data interface (FDDI), may be used without departing from the spirit or the scope of the present invention.

Alternatively, network data content and other types of data content included in the downstream data, such as digital video content, can be routed by the network protocol module 320 to the Media Independent Interface (MII) 360. As will be understood by those skilled in the art, Media Independent Interfaces often are used to provide transparent connectivity between the MAC layer of an Ethernet device and the physical layer of the network medium used by the Ethernet device. Accordingly, the MII 360 can be used to transmit/receive Ethernet-compliant frames of data between the network protocol module 320 and the alternate interface 362, which can include a physical interface for any of a variety of physical mediums, such as 10-BaseFX, an HPNA-compliant interface, an IEEE 802.11b interface, and the like.

Conversely, for upstream data provided from one or more subscriber devices over networks connected to the ports 366, 370-378, the data is received via the corresponding port and provided to the network protocol module 320. Voice content from the telephony devices is received via one or more of the telephony ports 370-376 as an analog signal that is converted to digital data by the CODEC/SLIC 334. The digital data representing the upstream voice content is then processed by the voice processing module 330 and provided to the network protocol module 320, whereupon it is processed by the appropriate network protocol stack, such as by encapsulating VoIP packets into upstream ATM cells, and the voice data is provided to the APON interface 250. Upstream data content from one or more subscriber devices is received via the Ethernet port 378 and provided to the Ethernet interface 350, whereupon the data content is de-encapsulated/re-encapsulated as necessary and then provided to the network protocol module 320 for processing into upstream ATM cells. The network protocol module 320 then provides the upstream ATM cells to the APON interface 250. Similarly, data contents or other contents can be received from one or more subscriber devices via the alternate interface 362, provided to the network protocol module 320 via the MII 360 for encapsulation into ATM cells, which are then provided to the APON interface 250.

The APON interface 250 scrambles and frames upstream ATM cells from the network protocol module 320, includes upstream PLOAM cells as appropriate, and provides the framed upstream data to the optical module 230 for transmission to an OLT over a PON to which the ONT 310 is connected. The functionality of the APON interface 250 is illustrated in greater detail with reference to FIG. 4.

A number of advantages can be obtained by integrating the functionality of various components of the PON processor 340 as a single integrated circuit. For one, ONT developers typically can implement more easily a single IC that provides an integrated solution compared to the effort and cost involved in developing an ONT using discrete components for its PON processor. Secondly, the cost of implementing an integrated solution can be much lower than with discrete components. To illustrate, the APON interface 240, the voice processing module 330, and/or the network protocol module 320 are adapted to share a single memory 304, such as SDRAM, for temporary data storage. However, if the APON interface 250, the voice processing module 330, and/or the network protocol module 320 were to be implemented as separate, discrete components, as in known solutions, either a separate memory (e.g., RAM) must be implemented for each discrete component or a complex memory access/control mechanism must be implemented to allow shared access to the memory by the discrete components. As a result, significant time and effort could be expended by the APON interface 250 in buffering the data between separate components. Instead, by sharing the same memory (e.g., burst buffer 416, FIG. 4), the transmission of data between the elements of the APON interface 250 typically is considerably faster due the decrease in the time of transmission of electronic signals between elements, the decrease in the complexity of the data buffering process between elements, and the like.

Although FIGS. 2 and 3 illustrate exemplary embodiments of an integrated PON processor having a voice interface, a video interface, and one or more network data interfaces, the present invention is not intended to be limited in number, type, and/or combination of data interfaces. For example, an integrated PON processor in accordance with the present invention can include a signal data interface, such as a single voice interface or a single network data interface. Alternatively, the integrated PON processor can include a plurality of data interfaces, of the same or different types, such as an integrated PON having three network data interfaces or two network data interfaces and two voice interfaces. Although a variety of data interfaces are illustrated herein, those skilled in the art can implement other types of data interfaces, using the guidelines provided herein.

Figure 4:
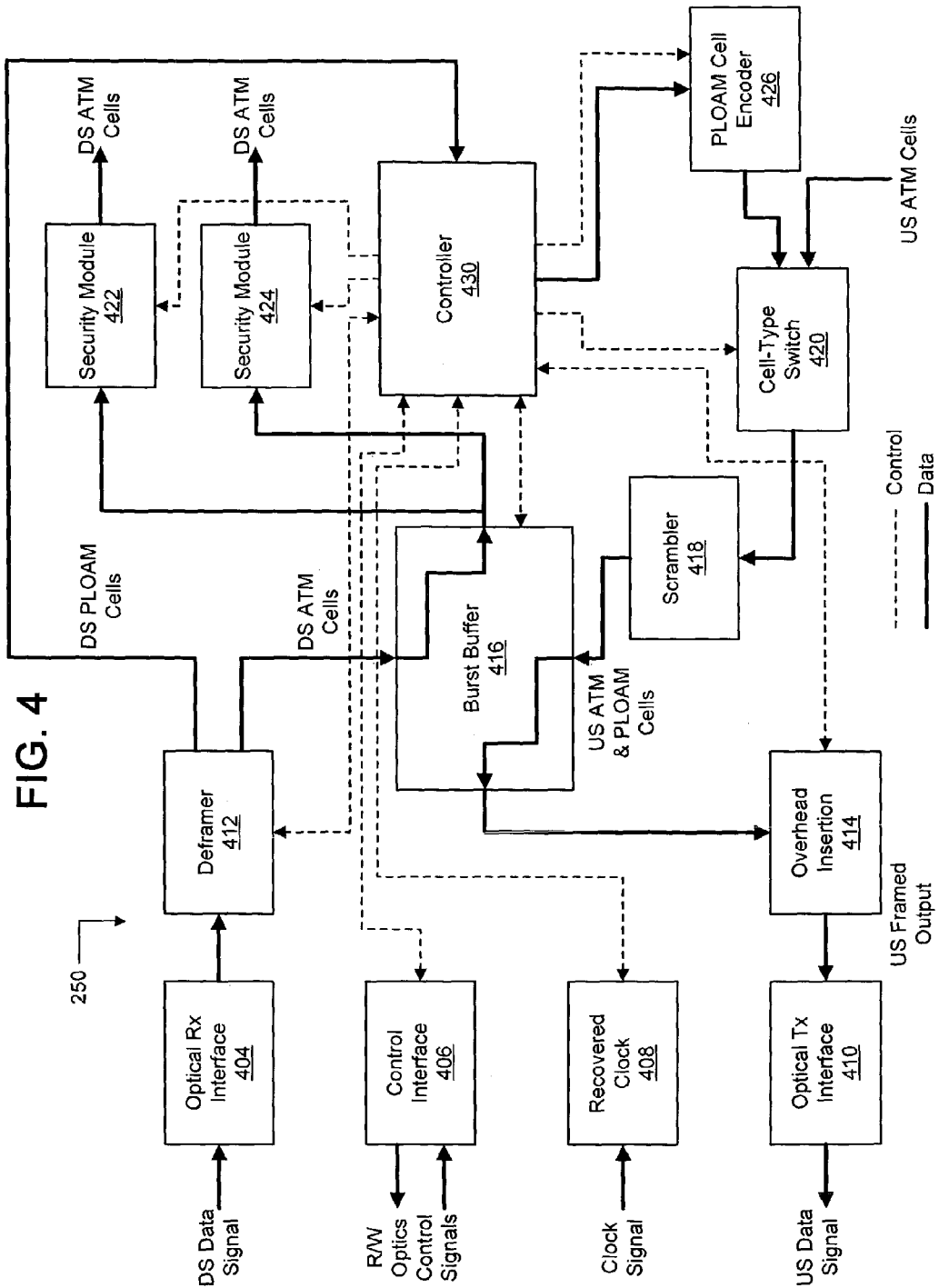
FIG. 4 is a schematic diagram illustrating an exemplary implementation of an APON interface of an ONT in accordance with at least one embodiment of the present invention.

Referring now to FIG. 4, an exemplary functionality of the APON interface 250 is illustrated in greater detail in accordance with at least one embodiment of the present invention. In one embodiment, the APON interface 250 is implemented as a finite state machine comprising two components: a controller (controller 430) and an upstream/downstream data path (represented by modules 404-426). The data path processes the upstream and downstream data for transmission and reception. In one embodiment, two types of cells are processed by the data path: ATM cells and PLOAM cells. ATM cells contain the data content, signaling information, and Operations and Management (OAM) information, while PLOAM cells are utilized to provide physical infrastructure information, as well as data grants, PLOAM grants, ranging grants, access codes from the OLT, and the like.

Downstream Data Path

Downstream data (i.e., data received from an OLT via a PON), in one embodiment, is routed through the optical Rx interface 404, the deframer module 412, and either the controller 430 (PLOAM cells) or to one of the security modules 422, 424 (ATM cells). The data contents of the ATM cells are then provided to the ATM layer of one or more network protocol stacks implemented by the network protocol module 320 (FIG. 3) for further processing. The components of the downstream data path are discussed below:

Optical Rx Interface 404

The optical Rx interface 404, in one embodiment, is adapted to receive downstream data from the O/E converter 234 of the optical module 230 (FIG. 2), where the downstream data is representative of an electrical conversion of the optical signal that represents downstream content being transmitted from an OLT to the ONT 210 across a PON. The optical Rx interface 404, in one embodiment, provides the framed downstream data to the deframer module 412 as a serial bit stream. Alternatively, the framed downstream data can be provided to the deframer module 412 as parallel data stream. The optical Rx interface 404 can include any of a variety of interfaces suitable for receiving data from an optical module. An exemplary implementation of the optical Rx interface 404 is discussed with reference to FIG. 5.

Deframer Module 412

The deframer module 412 interfaces with the optical Rx interface 404 to receive the bit stream representing the frames of data sent from the OLT. The deframer module 412, in one embodiment, delineates the received bit stream at each cell slot boundary of the bit stream to identify the cells. The delineated cells are filtered based on the header contents of the cells. Downstream PLOAM cells are provided to the controller 430 for further processing. In at least one embodiment, the controller 430 uses the information contained in the PLOAM cells to control the operation of the APON interface 250, as noted above.

However, since the PON architecture is a single point-to-multipoint network architecture, data sent from an OLT over a PON typically is received by all OLTs connected to the PON unless extensive filtering or other relatively expensive or power consuming mechanisms are used. Accordingly, virtual path (VP) identifiers, as well as virtual circuit identifiers, often are used to identify the source and intended destination of an ATM cell. Accordingly, in one embodiment, the deframer module 412 is adapted to compare the virtual path (VP) identifiers of downstream ATM cells with the VP identifiers associated with the PON processor 240. Those downstream ATM cells having matched VP identifiers are passed to one of the security modules 422, 424 via the burst buffer 416 for further processing. ATM cells with mismatched VP are discarded by the deframer module 412.

Burst Buffer 416

It will be appreciated that the data transfer rate between points of a network such as a PON often varies significantly, or is "bursty," resulting in data being transmitted at a rate greater than the data processing rate of the destination ONT, resulting in overflow. Alternatively, the data is transmitted at a rate less than the data processing rate of the destination ONT, resulting in data starvation. Accordingly, in at least one embodiment, the APON interface 250 implements a burst buffer 416 to buffer upstream and downstream data to prevent overflow and/or starvation. The burst buffer 416 can be implemented using any of a variety of buffer architectures, such as RAM, registers, cache, flash memory, and the like. For example, the burst buffer 416 can include embedded SRAM available under the tradename 1T-SRAM Macro® available from MoSys, Inc. of Sunnyvale, Calif. The burst buffer 416 preferably is implemented as part of the PON processor 340. However, in other embodiments, the burst buffer 416 can be implemented "off-chip", such as in system memory. An exemplary implementation of the burst buffer 416 is illustrated with reference to FIG. 6.

In at least one embodiment, the overhead insertion module 414 inserts APON overhead bytes after upstream ATM/PLOAM cells are retrieved from the burst buffer 416 for upstream transmission. As a result, the downstream cells and the upstream cells are of the same size (e.g., 53 bytes), thereby allowing the burst buffer 416 to be shared between the upstream and downstream data paths without requiring a complex control mechanism that generally would be required if the upstream and downstream cells were of different sizes. Additionally, because the cell sizes are the same, the burst buffer 416 can be allocated with less difficulty. Accordingly, should the properties of the upstream and downstream data path change (i.e., the user uploads a large file), the allocation of the storage of the burst buffer 416 between the upstream data path and the downstream data path can be more easily adjusted and managed.

Security Modules 422, 424

Since downstream data from an OLT typically is received at every downstream ONT on a certain PON in the absence of expensive protection mechanisms, the ITU G.983.X Recommendation has implemented a rudimentary security mechanism to protect downstream data from unauthorized access. This rudimentary security mechanism includes the process of "churning" (a form of encryption) the payloads of the downstream ATM cells at an OLT prior to transmission of the cells over the PON to the ONTs. Once received at the intended ONT, the ONT "dechurns" the payloads of the ATM cells prior to providing the "clear" ATM cells to the ATM layer of a network protocol stack for further processing. Accordingly, in at least one embodiment, the security modules 422, 424 are adapted to dechurn received ATM cells to generate clear ATM cells.

However, while the data can be churned per se prior to transmission to the ONT, the ITU G.983.X Recommendation defines a churning key length of 24 bits, a length that generally is considered insufficient for robust protection. As such, in at least one embodiment, the payload data of the downstream ATM cells are encrypted prior to transmission using a more robust symmetric or asymmetric encryption scheme, such as the Data Encryption Standard (DES), Triple DES, Rivest, Shamir, & Adleman (RSA) encryption, and the like. Accordingly, the security modules 422, 424, in one embodiment, are adapted to decrypt the cell payloads using the appropriate decryption key in addition to, or rather than, dechurning the payload using the churning/dechurning mechanism defined by the ITU G.983.X Recommendation. To illustrate, the ONT 210 could be used to receive data from a data source using an OLT. Prior to transmitting the requested data, the data source could use a public key provided by the ONT to encrypt the data before it is provided to the OLT. The OLT then can churn the encrypted data and provide the churned and encrypted data to the ONT. The ONT then can dechurn the data to obtain the encrypted data, which the ONT then can decrypt to obtain the "clear" data from the data source. Instead of churning the already encrypted data, the OLT can be adapted to provide the encrypted data from the data source to the ONT without unnecessarily churning the encrypted data.

In at least one embodiment, the OLT connected to the ONT 210 can be adapted to associate multiple APON identifiers with a single connection with the APON interface 250, where each APON identifier can be associated with a different data content type, source, and/or destination. For example, video data and voice data each could have a different APON identifier. Using these different APON identifiers, the OLT can be adapted to encrypt the video data with a different encryption algorithm or key than the encryption algorithm or key used to encrypt the voice data based in part on their different APON identifiers.

The use of different encryption schemes for different data sources can be performed to provide an additional layer of security or it can be used to improve the efficiency of the encryption of data, as some types of content may be less confidential than others or more easily encrypted. Accordingly, in one embodiment, each of a plurality of APON identifiers implemented by the PON processor 340 (FIG. 3) is associated with a different security module of the APON interface 250. In this case, the deframer module 412 can be adapted to route a downstream cell to one of the security modules 422, 424 based on its APON identifier. In this case, each of the security modules 422, 424 is adapted to implement a different decryption scheme/decryption key to decrypt the received cell payload data as appropriate.

In one embodiment, the security modules 422, 424 are implemented as separate hardware components of an integrated PON processor 340. For example, the PON processor 340 could implement two separate circuits, each adapted to implement one of the two security modules 422, 424 different encryption schemes. Alternatively, the PON processor 340 could implement the security modules 422, 424 as two instances of a single software function run on a single processor, each instance having a different decryption key and/or decryption algorithm. The clear downstream ATM cells from the security modules 422, 424 are provided to an ATM layer of a network protocol stack (such as a protocol stack implemented by the network protocol module 320 of FIG. 3) for further processing. One exemplary implementation of the security modules 422, 424 utilizing a more robust encryption/decryption mechanism is illustrated in greater detail with reference to FIG. 7.

Upstream Data

Upstream data (i.e., data received by an ONT from one or more subscriber devices), in one embodiment, is provided to the APON interface 250 in the form of ATM cells from the ATM layer of a network protocol stack and provided to the cell-type switch 420. Likewise, upstream PLOAM cells generated by controller 430 are provided to the cell-type switch 420. Based on control signals from the controller 430, the cell-type switch 420 selects from the PLOAM cell input and the ATM cell input to provide either an ATM cell or a PLOAM cell to the scrambler 418. It will be appreciated that the ATM protocol describes the addition of a PLOAM cell to a frame at a certain interval (e.g., 5 microseconds) or after a certain number of ATM cells have been placed in a frame. Accordingly, the controller 430 can be adapted to manage PLOAM cell addition by directing the addition of a PLOAM cell from the PLOAM cell encoder 426 to the upstream data path by controlling the cell-type switch 420. The scrambler 418 scrambles the payload of the input cells and provides them to the overhead insertion module 414 via the burst buffer 416. The overhead insertion module 414 associates overhead with each ATM and PLOAM cell, frames the cells and overhead, and provides the upstream frames to the optical Tx interface 410. The optical Tx interface 410 then transmits the upstream frames to the optical module 230 (FIG. 3) for conversion into an optical signal for subsequent transmission over a PON to an OLT. The main components of the upstream data path are discussed below:

PLOAM Cell Encoder 426

The PLOAM cell encoder 426, in at least one embodiment, is adapted to format the PLOAM cells and calculate the required check sequences. Particularly, the PLOAM cell encoder 426 is adapted to: format the identification (IDENT) messages; format the PON ID; format the message field; calculate the message field cyclic redundancy check (CRC); format the laser control fields; format the receiver control fields; calculate the Bit Interleaved Parity byte for the PLOAM cell; and the like.

Scrambler Block 418

The scrambler block 418, in one embodiment, is adapted to perform a scrambling operation (as opposed to churning) on the payload of upstream ATM and PLOAM cells received from the cell-type switch 420. In one embodiment, upstream cells are scrambled using the generating polynomial: $x^9+x^4+1$. The generated bit pattern is added modulo 2 to each upstream cell. The generating polynomial registers (not shown), in one embodiment, are initialized by the controller 430. The upstream cells having scrambled payloads are provided to the overhead insertion module 414 via the burst buffer 416.

Upstream Overhead Insertion Module 414

The upstream overhead insertion module 414, in one embodiment, is adapted to retrieve/receive cells from the burst buffer 416 based on the slots granted by the OLT and to affix overhead to each upstream ATM cell and/or PLOAM cell received from the burst buffer 416. The overhead content is determined by the controller 430 through decoding the upstream_overhead message typically having a guard time, a preamble, and a delimiter programmed by the OLT. The upstream_overhead message can be used by the OLT to adjust the inter-cell gap from different ONT streams, provide a pattern for OLT receiver clock locking, and signal the start of the upstream cell (PLOAM or ATM). The overhead is then inserted into the outgoing upstream frame as appropriate. In one embodiment, each upstream frame comprises 53 cell slots to be distributed among the ONTs of a PON, each cell slot representing 56 bytes of data. Either an upstream ATM cell or a PLOAM cell can be added to any given cell slot. In this case, the ATM cells and the PLOAM cells are each 53 bytes in length (5 bytes of header data, 48 bytes of ATM payload or PLOAM message data). The overhead is three bytes in length and is pre-pended to each ATM cell or PLOAM cell to generate an overall data size of 56 bytes, which matches the size of the cell slots of the upstream frame. When an ONT has been granted to use a certain cell slot of the upstream frame to transmit a cell, if any, to the OLT, the ONT can provide the upstream cell the optical module 230 of the ONT 210 (FIG. 2) via the optical Tx interface 410 for transmission during the granted slot of the upstream frame. Additionally, in one embodiment, the overhead insertion module 414 is further adapted to adjust the data pattern balance and/or the transmission equalization delay, as appropriate. Implementations of the optical Tx interface 410 and the optical Rx interface 404 are discussed with reference to FIG. 5.

Other Features

Additionally, in at least one embodiment, the APON interface 250 includes a general purpose input/output (GPIO) and/or a control interface 406 to receive/transmit information between the controller 430 and the remainder of the PON processor 240. The control interface 406, in one embodiment, is adapted to provide control information to, and receive status information from, an optical module to which the APON interface 250 is connected (e.g., the optical module 230 of FIG. 2). This control information, in one embodiment, includes control data sent to the optical module and/or control information sent to the controller 430 of the APON interface 250. In one embodiment, the control interface 406 includes, for example, a two wire High Speed I2C interface (per Phillips Version 2.1 1999 specification). With the PON processor 340 operating in the master mode, the implementation of a High Speed I2C interface typically would allow bit transfer rates of 3.4 megabits-per-second (Mbps) across the control interface 406. Address bits could be implemented to identify the functional or information type to be accessed. Likewise, data bits could be used to direct a specific action of the optical module 230 to occur.

Utilizing a 10 bit addressing scheme, adding other required bits (start, acknowledge, etc.), and an 8 bit data scheme generally would allow a control word rate of about 147 kilowords per second. This rate corresponds to about 22 control read/write operations per PON frame. Alternatively, if a 7 bit addressing scheme should be adequate for a given optical module, the control rate could be increased to 27 control read/write operations per PON frame. As such, this implementation of the control interface 406 could provide flexibility and adaptability for multiple source optical modules.

The functionality of the optical module 230 controlled via this scheme can include, but is not be limited to: transmitter laser diode bias and modulation control; transmitter laser diode temperature control (heater, cooler, etc.); receiver trans-impedance amplifier gain or bias control; clock frequency or phase adjustment; test functions such as loop backs, reference or stored data comparisons, self test, etc.; and read status and alarms such as optics transmitter end of life, environmental, signal levels, etc. These functions, in one embodiment, are controlled or accessed from the optical module via registers within the optical module. Accordingly, the PON processor 240 can access and adjust the optical module registers as required by the ONT 210 for G.983.X-compliant operation. Although one embodiment of the control interface 406 has been illustrated, those skilled in the art may develop other implementations of the control interface 406 in accordance with the present invention using the guidelines provided herein.

In addition to providing improved ease of implementation, the organization of the APON interface 250, as illustrated, can provide a number of benefits over discrete implementations of a PON processor. To illustrate, the use of the deframer module 412 to distinguish ATM cells and PLOAM cells destined for a specific ONT can significantly reduce the processing effort required by other components of the integrated PON processor. For example, discrete implementations of a PON processor typically pass all downstream cells to a network protocol processor regardless of their intended destination. As a result, the network protocol processor must spend a significant amount of processing effort in determining those cells intended for the ONT and discarding all others. Likewise, all cells typically are stored in a buffer prior to being processed or discarded by the network protocol processor, thereby requiring a substantial buffer size. However, since the deframer module 412 can pre-filter the downstream frames and provide only those ATM and PLOAM cells intended for the corresponding ONT, both the size of the burst buffer 416 and the processing power of the network protocol module 320 (FIG. 3) in the integrated PON processor 340 can be reduced compared to discrete implementations of a PON processor with the same functionality.

Similarly, the arrangement of the overhead insertion module 414 in relation to the burst buffer 416 can reduce the silicon size of the IC and therefore the cost of the IC. Since the overhead insertion module 414, in the illustrated embodiment, is adapted to insert the APON overhead bytes after the data is buffered in the burst buffer 416, upstream and downstream cells stored in the burst buffer 416 are both of the same size (e.g., 53 bytes). Accordingly, the ratio of the storage of the burst buffer 416 assigned to upstream cells to the storage assigned to the downstream cells can be dynamically changed depending on the operation of the ONT without requiring a complex control mechanism that typically would be necessary if the upstream and downstream cells stored in the burst buffer 416 were of different sizes. As a result, neither a complicated control mechanism nor separate burst buffers 416 are necessary to buffer both upstream and downstream ATM and PLOAM cells.

Figure 5:
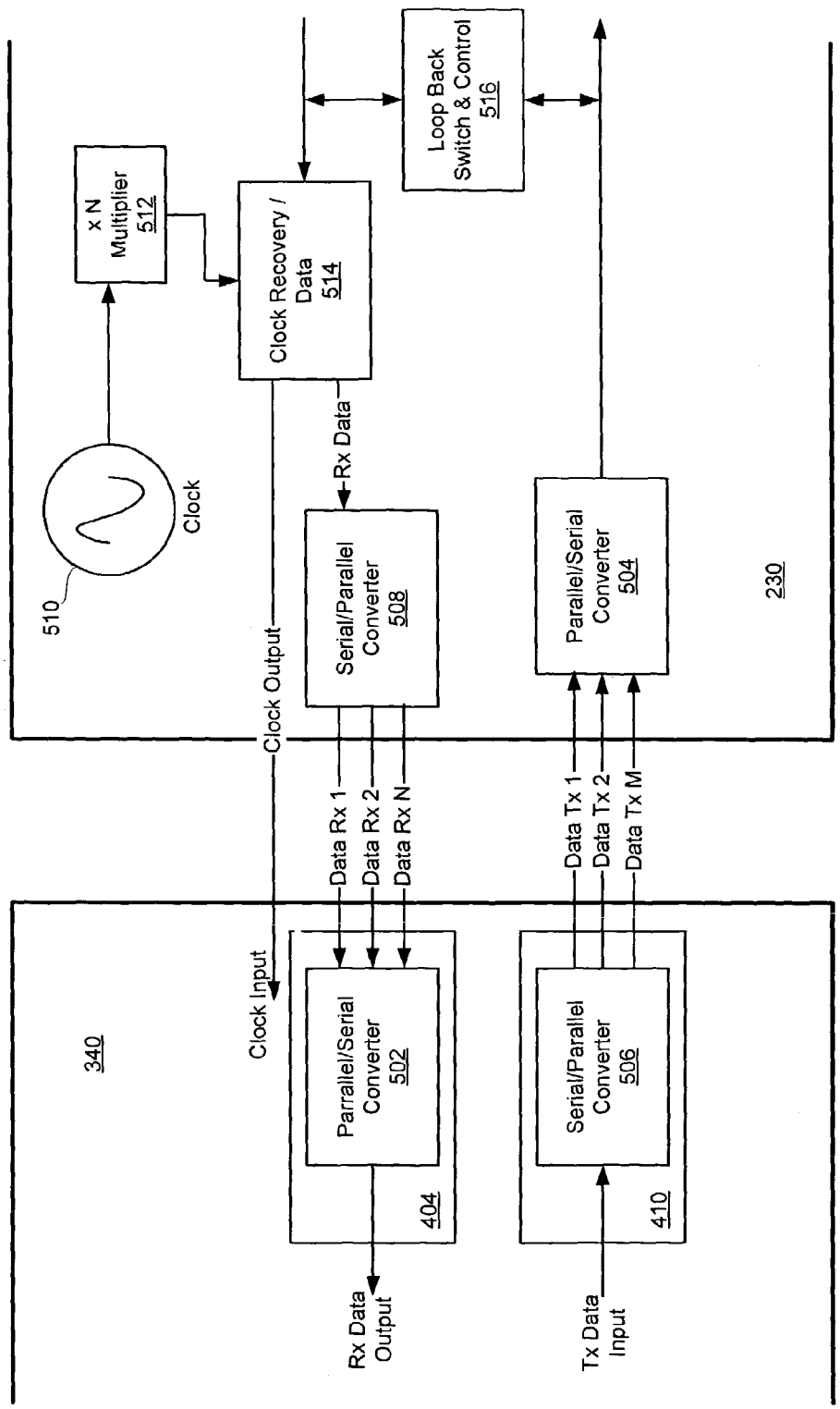
FIG. 5 is a schematic diagram illustrating an exemplary implementation of an optical interface of the APON interface of FIG. 4 in accordance with at least one embodiment of the present invention.

Referring now to FIG. 5, an exemplary implementation of the optical interfaces 404, 410 is illustrated in accordance with at least one embodiment of the present invention. In at least one embodiment, the optical interfaces 404, 410 include physical layer interfaces for interfacing with the optical module 230 (FIG. 2). FIG. 5 illustrates a preferred serial nibble implementations of such physical interfaces, where the optical Rx interface 404 includes a parallel-to-serial (P/S) converter 502 coupled to a serial-to-parallel (S/P) converter 508 of the optical module 230 and the optical Tx interface 410 includes an S/P converter 506 coupled to a P/S converter 504 of the optical module 230. Likewise, the optical module 230 includes a clock 510, a clock multiplier 512, and a loop back/switch control module 516. The clock recovery/data module 514 is utilized to extract the clock signal from the optical bit stream from the optical module 510 (after any clock scaling performed by the clock multiplier 512), clock the data samples into and out of the P/S 504 and S/P converters 508, and rate adapt/lock the optical module clock 510 to the local PON processor clock (not shown). The loop back/switch control module 516, in one embodiment, is adapted to loop back data upstream for troubleshooting or diagnostic purposes. In at least one embodiment, the optical interfaces 404, 410 are adapted to implement Low Voltage Differential Signals capabilities based upon IEEE Standard 1596.3-1996 reduced range implementation criteria.

For the downstream data, several possible clock multiplier values and the resulting receive data rate per connection may be used, as illustrated in Table 1. This scheme would not require the Scaleable Coherent Interface signal encoding methods listed in the reference standard as clock skew would not be an issue at rates up through 1244.16 Mbps (Optical Carrier Level 24 or OC24). For the upstream data at 155.52 Mbps (asymmetric PON case), two possibilities are shown in the Table 2. Should symmetric rates of 622.08 Mbps or greater be considered, the same scheme as used for the downstream data in Table 1 could be applied for the upstream data. The overall above listed scheme would also apply for any multiples of Optical Carrier Level 3 (OC3) standard. As such, data rates of 1244.16 Mbps (OC24) or higher could also be easily accommodated until the point that clock input and data line skew become an issue with regards to recovered signal fidelity.

TABLE 1

| Downstream Data Transmission Rates | | | | |
|---|---|---|---|---|
| Aggregate Downstream Data Rate [Mbps] | Clock Multiplier [N] | Individual Connection Data Rate [Mbps] | Clock [MHz] | Clock Input Frequency [MHz] |
| 1244.16 | 8 | 155.52 | 19.44 | 155.52 |
| 622.08 | 8 | 77.76 | 19.44 | 77.76 |
| 622.08 | 4 | 155.52 | 38.88 | 155.52 |
| 155.52 | 1 | 155.52 | 38.88 | 155.52 |

TABLE 2

| Upstream Data Transmission Rates | | | |
|---|---|---|---|
| Aggregate Upstream Data Rate [Mbps] | Number of Upstream Path Connections | Individual Connection Data Rate [Mbps] | Clock Input Frequency [MHz] |
| 155.52 | 1 | 155.52 | 155.52 |
| 155.52 | 2 | 77.76 | 77.76 |

The illustrated interface scheme of FIG. 5 typically ensures scalability, ease of implementation, minimal power dissipation, good common mode rejection, low electromagnetic interference (EMI), and allow simple printed circuit board (PCB) implementation (i.e., less sensitive to transmission line environment imperfections).

Referring now to FIGS. 6A and 6B, an exemplary implementation of the burst buffer 416 is illustrated in accordance with at least one embodiment of the present invention. In at least one implementation, the burst buffer 416 serves as a flexible resource for both data paths (upstream and downstream). For example, the burst buffer 416 can be used to buffer downstream cell bursts and perform upstream cell burst mitigation. To illustrate, assume that downstream data enters the PON processor 340 in bursts having a burst transfer rate of 622 Mbps. However, the PON processor 340, in this example, only is able to process downstream cells at about an Optical Communications Level 3 (OC3) rate of 155 Mbps continuously. As such, the ability to queue up some amount of data until processor bandwidth is available is necessary to prevent data loss. Likewise, upstream data may be provided from the customer to the PON processor 340 in bursts having a data rate higher than the upstream data transmission rate of the PON. Accordingly, the burst buffer 416 can be used to buffer the data in the upstream direction to prevent data loss in the upstream direction.

In one embodiment, the burst buffer 416 is implemented as embedded SDRAM, such as a chip Macro, preferably having a depth of at least about 1 megabit. The appropriate depth of the burst buffer 416 is contingent upon the maximum number of consecutive cells in a frame that may be assigned to an ONT. This generally is under the control of the central office OLT and not specified in the ITU G.983.X Recommendation. The upstream burst depth required is contingent upon the maximum number of contiguous cells to be transmitted. The Dynamic Bandwidth Allocation (DBA) standard (i.e., the ITU G.983.4 and G.983.7 Recommendations) only specifies a messaging/control protocol and does not specify this parameter. It is therefore vendor specific and under the control of the OLT. A depth of at least 1 megabit generally would allow for about 10 downstream frames to be buffered in the burst buffer 416 if used entirely for this purpose (in reality only 1 or 2 frames should be required under any reasonable bursting scheme). If used for upstream only as many as 44 upstream frames could be buffered.

One exemplary mechanism for the burst buffer 416 is described with reference to the illustrated embodiment. The burst buffer 416, in one embodiment, comprises an upstream buffer portion to buffer upstream data and a downstream buffer portion to buffer downstream data. Each buffer portion, in one embodiment, comprises a number of memory elements (a bit, byte, word, long word, etc.) that can be dynamically and logically partitioned into one or more sub-buffers. The size/location of the sub-buffers, in one embodiment, can be modified by, for example, an OLT or the controller 430 (FIG. 4) based on a number of factors, such as a potential for underflow/overflow, a change in the bandwidth associated with a particular sub-buffer, the change in the transmission characteristic of a content associated with a particular sub-buffer, and the like. A transmission characteristic associated with the content can include requirements specific to the network protocol used to transmit the data, the traffic status of the data stream, and the like. Although an exemplary implementation of the upstream buffer portion of the burst buffer 416 is illustrated with reference to FIGS. 6A and 6B, it will be appreciated that the downstream buffer portion of the burst buffer 416 can be implemented in a similar manner.

With reference to the illustrated embodiment of FIGS. 6A and 6B, the upstream buffer portion 602 of the burst buffer 416 comprises memory elements 630-664 partitioned into three sub-buffers 622-626. Each sub-buffer is associated with a specific data content of the upstream data and is specified by a starting and ending address. The sub-buffer entries can be accessed either directly by specifying the logical or physical address of the entry, or indirectly through a number of dynamically allocated input and output pointers, including: pointers 602, 604 referencing the input and output buffer locations of the sub-buffer 622, respectively; pointers 606, 608 referencing the input and output buffer locations of the sub-buffer 624, respectively; and pointers 610, 612 referencing the input and output buffer locations of the sub-buffer 626, respectively.

The pointers 602-612, in one embodiment, are managed by the controller 430. Using their respective input and output pointers, the controller 430, in one embodiment, manages the pointers 602-612 to implement sub-buffers 622-626 as circular buffers. As such, each of the pointers is capable of wrapping around its respective sub-buffer when the end address of the sub-buffer is reached. Additionally, the controller 430 can be adapted to provide the pointers with a flexible increment/decrement capability.

For each sub-buffer 622-626, the separation (measured in memory elements) of its pointer for input indexing and its pointer for output indexing is referred to as the queue length. The queue length of a sub-buffer can be updated automatically by the burst buffer 416 and made available to the controller 430. Based on this queue length information, the controller 430, in one embodiment, is adapted to generate and send an alarm or appropriate message to be sent to the OLT if the queue length falls below a minimum threshold or goes above a maximum threshold set by the PON processor 340 or an OLT.

The ability to signal the OLT regarding the status of the sub-buffers of the burst buffer 416, in one embodiment, enables the OLT to implement dynamic bandwidth allocation (DBA) to assign bandwidths to different content transmissions based on the conditions of their associated sub-buffers and/or the traffic status of their associated data streams. The bandwidth can be allocated between ONTs, between data types, or a combination thereof. To illustrate, assume that a PON is used to simultaneously transmit video/audio data from a video conference (e.g., MPEG data), voice content data (e.g., VoIP packets) from a telephone call, and data traffic (e.g., IP packets) from a content server on the Internet from an OLT to the ONT 210 (FIG. 2). A video conference typically requires that a fixed bandwidth with a cell delay/cell delay variation controlled data pipe be used. Audio telephony generally requires that a real time variable bit rate capability (peak cell rate, sustained cell rate, and cell transfer/variation delay) be available. Both of these applications also require that cell loss be minimized. An Internet data connection often requires a low cell loss ratio but is somewhat flexible as far as delay and bandwidth requirements. To describe these transmission characteristics, the ITU G.983.4 Recommendation includes a series of five transmission container (T-CONT) types, illustrated in Table 3.

TABLE 3

T-Cont Types

| T-CONT Type | Description |
|---|---|
| 1 | Fixed bandwidth, cell transfer delay controlled, cell delay variation controlled |
| 2 | Average rate guaranteed, no delay controlled |
| 3 | Assured & non-assured bandwidth, variable rate but not real-time |
| 4 | No bandwidth guarantee-best effort only, no delay control |
| 5 | Fixed, assured, non-assured and best effort bandwidth, cell transfer delay controlled, cell delay variation controlled |

From the T-CONT descriptions of Table 3, it can be determined that T-Cont type 5 best fits the simultaneous video conference, telephone, and Internet data sessions. The video conference and telephony traffic generally would have to fit within the fixed-plus-assured bandwidth service space. This fixed-plus-assured space could be provisioned such that a small amount more than needed is allotted for the connection to allow for some minimal Internet data capability. Additionally, any excess not required by the telephony traffic (i.e., since it is variable bit rate some extra may exist) could be applied to Internet traffic. The non-assured-plus-best-effort bandwidth would be used for bursty Internet data conditions such as when downloading a large file.

The burst buffer 416, in this scenario, could place the three upstream data contents in logical sub-buffers, with sub-buffer 622 used to buffer upstream data from the telephony session, sub-buffer 624 used to buffer upstream data from the video conference, and the sub-buffer 626 used to buffer upstream data from the Internet session. These sub-buffers 622-624 would make up one T-CONT entity with Type 5 attributes. During a first time, illustrated with reference to FIG. 6A, the controller 430 assigns a queue length of six memory elements to the sub-buffer 622, a queue length of six memory elements to the sub-buffer 624, and a queue length of six memory elements to the sub-buffer 626 of the upstream buffer portion 602.

In this example, assume that amount of upstream data from the telephony session increases at a second time such that the sub-buffer 624 would overflow unless it is enlarged or the data transmission rate is changed. In one embodiment, the controller 430, noting the rapidly filling sub-buffer 626, could be adapted to signal the OLT of the status of the sub-buffer 626. Based on this signal, the OLT could be adapted to change the bandwidth allocation between the three content sessions by assigning more slot grants to the particular ONT, thereby increasing the upstream data transmission rate capability of the ONT. Alternatively, the OLT could signal the controller 430, using the ITU G.983.4 standard, to dynamically modify the queue lengths of one or more of the sub-buffers 622-626 to accommodate the increased data rate of the telephony session.

As illustrated in FIG. 6B, since the Internet data session is not reliant on a fixed bandwidth, the queue length of sub-buffer 622 associated with the Internet data session can be shortened from six memory elements to three memory elements by directing the controller 430 to adjust the pointers 602-604. Since the video teleconference session, in this example, is relying on a fixed bandwidth, the queue length of the sub-buffer 624 should not be shortened. However, the controller 430 can move the logical location of the sub-buffer 624 to make use of some or all of the memory elements freed by the changing of the logical location of the sub-buffer 622. The controller 430 can adjust the pointers 606, 608 of the sub-buffer 624 accordingly. By adjusting the queue length of the sub-buffer 622 and moving the logical location of the sub-buffer 624, four memory elements are freed and can be incorporated by the controller 430 to increase the queue length of the sub-buffer 626 by the four freed memory elements by adjusting the pointers 610, 612 to their positions illustrated in FIG. 6B. Accordingly, by utilizing circular sub-buffers and dynamic adjustments to the queue lengths of the sub-buffers 622-626, the controller 430 can minimize the potential for buffer overflow/underflow. Likewise, using the status of the sub-buffers 622-626 (e.g., the amount of fullness), the controller 430 could monitor fill level, generate required status reporting messages for use by an OLT, and the like. Similarly, the OLT can use the status information regarding the buffer portion to perform dynamic bandwidth allocation (DBA), determine the operating status of the ONT, and the like.

Figure 7A:
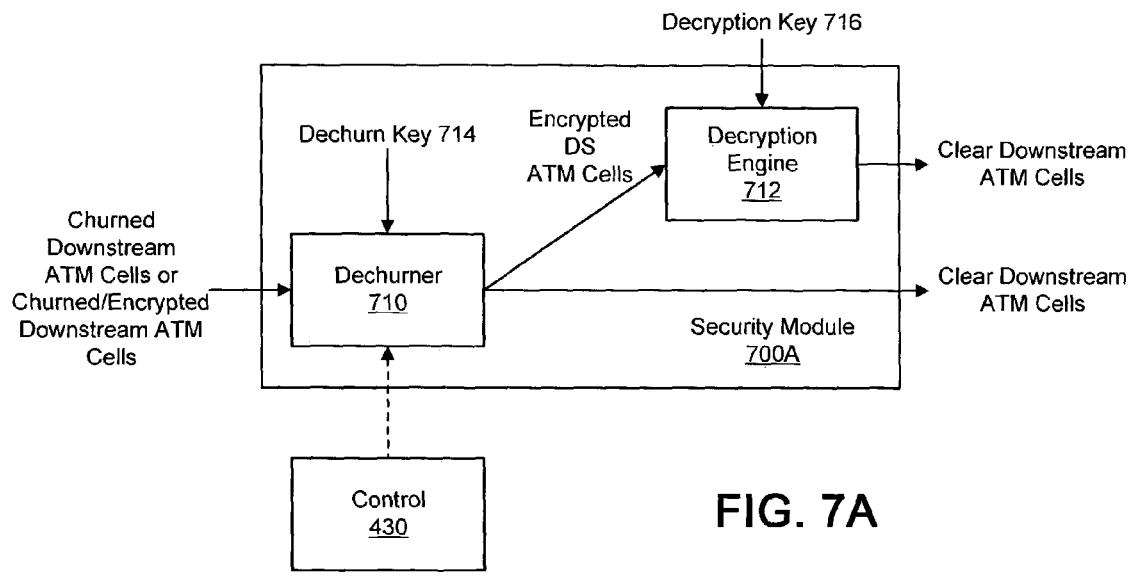
FIG. 7 is schematic diagram illustrating an exemplary implementation of a security module for providing data protection in the APON interface of FIG. 4 in accordance with at least one embodiment of the present invention.
Figure 7B:
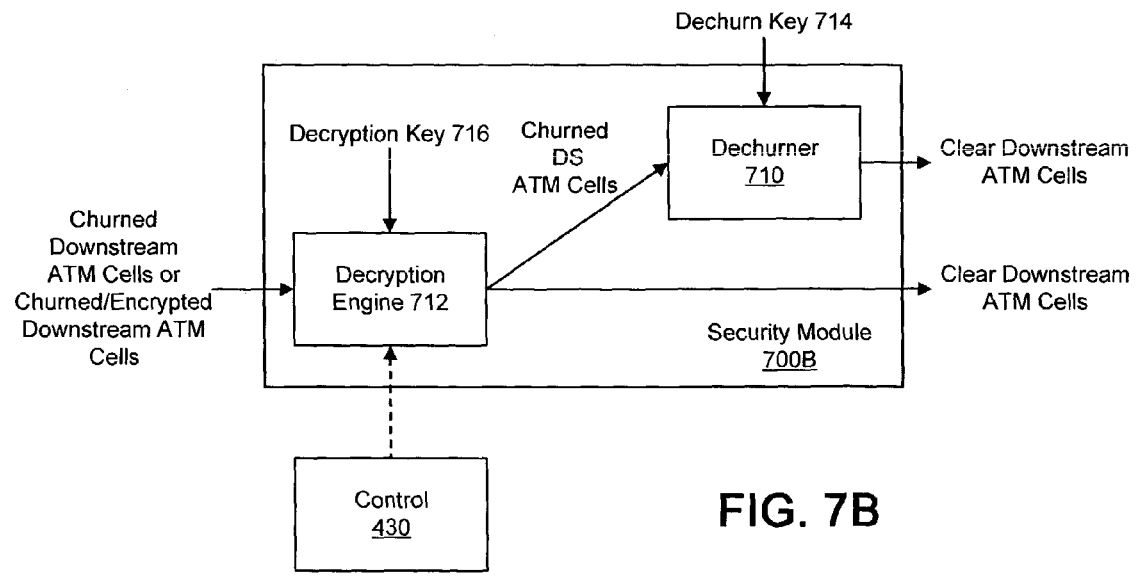

Referring now to FIGS. 7A and 7B, exemplary implementations of the security processor 422 of the APON interface 250 are illustrated in accordance with at least one embodiment of the present invention. As noted above, due to the multicast nature of the PON, downstream cells generally are accessible to all ONUs and ONTs on the network. Without further protection, PON typically does not provide robust data protection. The ITU G.983.1 Recommendation proposes a churning/dechurning system for downstream data protection. Accordingly, in at least one embodiment, the security module 422 includes a dechurner module 710 to dechurn the data payloads of received ATM cells in accordance with the ITU G.983.1 Recommendation. However, there are two basic weakness of the churning/dechurning system proposed by the ITU G.983.1 Recommendation. First, the proposed key (churning key 714) length is relatively short, being only 24 bits long. Second, the churning key 714 often is sent publicly by an ONT to an OLT on the PON. The key generally is only protected from other ONTs by the optical splitter attenuation and WDM filters.

To enhance the security of the system, the security modules 700A, 700B, in one embodiment, includes a decryption engine 712 to provide true decryption functionality. The decryption engine 712 can be adapted to implement any of a variety of encryption/decryption mechanisms, such as DES, 3DES, AES, and RSA to protect the data privacy. The payloads of the cells can be encrypted/decrypted by decryption engines 712 at both ends with the negotiated encryption algorithms. Negotiation of the encryption algorithm and the exchange of the keys 716 required for the encryption/decryption algorithms can be performed by protocol exchanges using vendor specific messages facilitated by the ITU G.983.X Recommendation.

FIG. 7A illustrates an implementation wherein the controller 430 provides the dechurner module 710 with a signal indicating whether the data payloads of the cells being dechurned were encrypted after being churned. If the payloads were encrypted, the output of the dechurner module 710 is provided to the decryption engine 712, whereupon the encrypted data payloads of the cells is decrypted and the clear ATM cells are provided to the ATM layer of a network protocol stack for further processing. Otherwise, the controller 430 directs the dechurner module 710 to bypass the decryption engine 712 and provide the ATM cells directly to the ATM layer.

Alternatively, FIG. 7B illustrates an implementation wherein in one embodiment, the payload of the ATM cells are churned and then encrypted. Accordingly, in this case, the ATM cells from the deframer 412 (FIG. 4) are provided first to the decryption engine 712 of the security module 700B, whereupon the payloads are decrypted, and then the ATM cells having a decrypted payload are provided to the dechurner 710. The dechurner 710 dechurns the ATM cells and provides the clear ATM cells to the ATM layer of a protocol stack (such as implemented by the network protocol module 320 of FIG. 3) for processing. In another embodiment, the data payloads of the downstream ATM cells are encrypted but not churned. Accordingly, in this case, the encrypted downstream ATM cells can be provided directly to the decryption engine 712 for decryption and subsequent output as clear ATM cells. Additionally, in at least one embodiment, the decryption engine 712 can be adapted to encrypt upstream data prior to transmission to the OLT.

Figure 8:
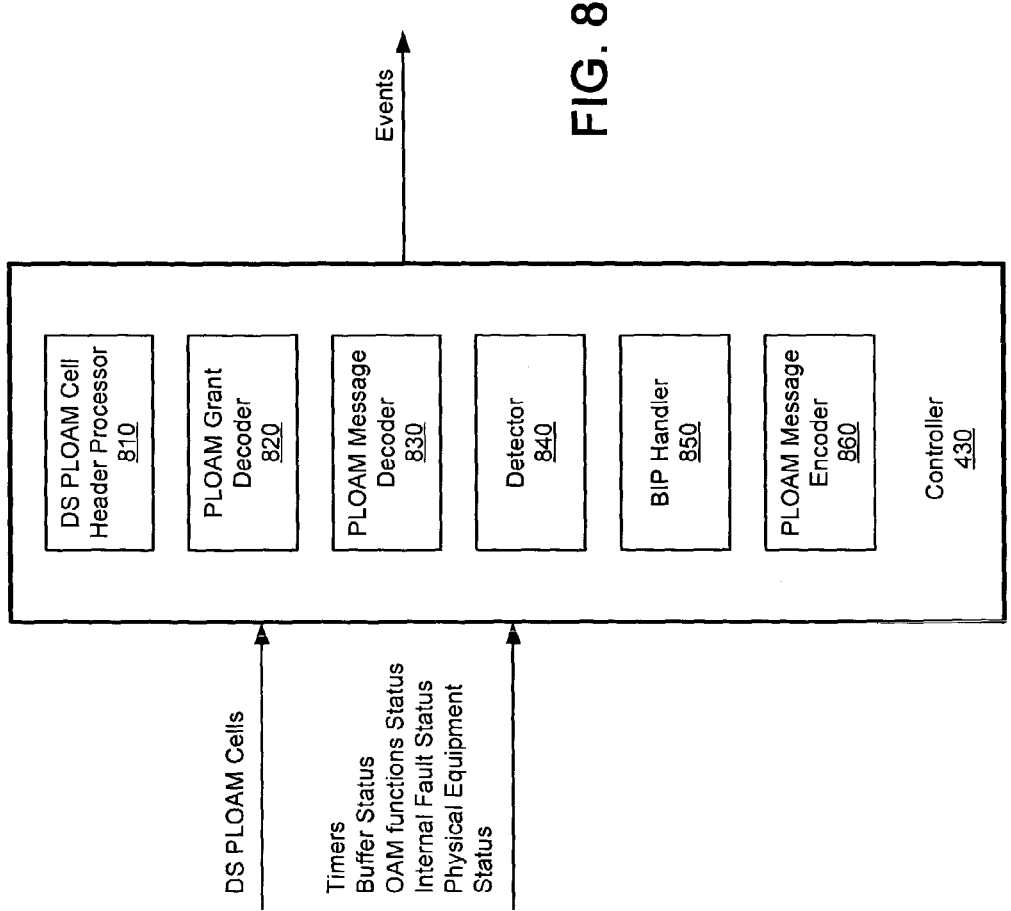
FIG. 8 is a schematic diagram illustrating an exemplary controller for controlling an operation of the APON interface of FIG. 4 in accordance with at least one embodiment of the present invention.

Referring now to FIG. 8, an exemplary implementation of the controller 430 is illustrated in accordance with at least one embodiment of the present invention. As noted above, the PON processor 340, in one embodiment, is implemented as a finite state machine. The configuration of the upstream and downstream data paths, the contents of upstream transmission and the timing of the cell transmission are determined by the state of the system. Events of the finite state machine are generated from the controller 430 based in part on received input. Associated with each event input to the finite state machine is a corresponding output of the finite state machine. While, in one embodiment, state transitions are only initiated as the result of events, not all events result in state transitions.

The controller 430, in at least one embodiment, accepts PLOAM cells, timer outputs, physical error signals and fault signals as inputs. Based on this input and the state of the APON interface 250, the controller 430 can generate events as outputs to drive the finite state machine (i.e., the APON interface 250). The controller 430 also can be adapted to initialize timers for timing events and detectors for the detection of events. In the illustrated embodiment, the controller 430 comprises six processing units: a PLOAM cell header processor 810; a PLOAM grant decoder 820; a PLOAM message decoder 830; an event detector 840; a BIP handler; and a PLOAM message encoder 860. The outputs of these processing units are events, which trigger the transition of states of the finite state machine and produce corresponding actions such as configuration of the upstream/downstream data path or responses to OLT requests.

The functionalities of the processing units of the controller 340 for ATM and APON processing are as follows:

PLOAM Cell Header Processor 810
1) Verify PLOAM cell header error check (HEC)
2) Perform frame synchronization
3) Perform clock recovery (Network Timing Reference)

PLOAM Grant Decoder 820
1) Decode Grant messages from the OLT
2) Validate Grant message cyclic redundancy check (CRC)
3) Set up equalization delay and slot for upstream transmission PLOAM Message Decoder 830
1) Identify PLOAM message recipient of received PLOAM message and discard the message if not relevant.
2) Verify message CRC, discard the message if the CRC is incorrect, and generate appropriate response to be sent to OLT for the indication of error.
3) Decode the message, generate proper events as the response of the message.

Detector Module 840
1) Monitor timer expirations
2) Perform physical equipment error detection
3) Perform internal fault detection
4) Perform signal/pattern detection as required
5) Determine and monitor the status of the burst buffer 416 for DBA purposes
6) Perform OAM functions such as loss of signal (LOS) notification, OAML, loss of cell delineation (LCD) evaluation, generation of PLOAM cells, and the like as defined by the ITU G.983.1 Reference.

Bit Interleaved Parity (BIP) Handler 850
1) Perform BIP calculation for upstream PLOAM cell transmission
2) Perform Downstream BIP calculation and validation PLOAM Message Encoder 860
1) Generate PLOAM messages
2) Perform CRC calculation Although the embodiments describer herein have focused on APON applications, the above description is by way of example only and is not a limitation of the PON processor and system of the present invention, which are applicable in all PON applications and not just APON applications. Other embodiments, uses, and advantages of the invention will be apparent to those skilled in the art from consideration of the specification and practice of the invention disclosed herein. The specification should be considered exemplary only, and the scope of the invention is accordingly intended to be limited only by the following claims and equivalents thereof.

What is claimed is:

1. In an optical network termination that is in optical communication with an optical line termination and operably coupled to at least one subscriber device, a security system comprising:
 a dechurner module being adapted to dechurn a portion of downstream data received from the optical line termination, the dechurner module including a signal indicating whether at least a portion of the received downstream data being dechurned is encrypted, wherein the downstream data is received from a deframer module based on an associated ATM Over Passive Optical Network (APON) identifier; and
 a decryption engine configured to, in response to a determination that at least a portion of the dechurned data is also encrypted, decrypt a digital encryption system, the decryption engine in electrical communication with the dechurner module and being adapted to decrypt the dechurned portion of the downstream data, wherein the optical line termination is configured to receive upstream data and wherein the decryption engine is further configured to encrypt upstream data prior to transmission to the optical line termination.

2. The security system as in claim 1, wherein a digital decryption algorithm used by the decryption engine to decrypt the dechurned portion is a DES decryption algorithm, a 3DES decryption algorithm, an AES decryption algorithm, or an RSA decryption algorithm.

3. The security system as in claim 1, wherein the portion of the downstream data includes a data payload of at least one downstream ATM cell.

4. In an optical network termination that is in optical communication with an optical line termination and operably coupled to at least one subscriber device, a security system comprising:
 a decryption engine configured to decrypt a digital encryption system, the decryption engine adapted to decrypt a portion of downstream data received from the optical line termination; and a dechurner module in electrical communication with the decryption module and being adapted to, in response to a determination that at least a portion of the downstream data is churned, receive the at least a portion of the downstream data and dechurn the decrypted portion of the downstream data, wherein in response to a determination that the downstream data is not churned, the decryption engine sends the decrypted downstream data directly to output, wherein the decryption engine is further configured to encrypt upstream data prior to transmission to the optical line termination, and wherein the downstream data is received from a deframer module based on an associated ATM Over Passive Optical Network (APON) identifier.

5. The security system as in claim 4, wherein a digital decryption algorithm used by the decryption engine to decrypt the portion of the downstream data is a DES decryption algorithm, a 3DES decryption algorithm, an AES decryption algorithm, or an RSA decryption algorithm.

6. The security system as in claim 4, wherein the portion of the downstream data includes a data payload of at least one downstream ATM cell.

7. In an optical network termination that is in optical communication with an optical line termination and operably coupled to at least one subscriber device, a method comprising the steps of:
receiving downstream data from a deframer module based on an associated ATM Over Passive Optical Network (APON) identifier;
decrypting a digitally encrypted, churned portion of the downstream data from the optical line termination using a digital decryption algorithm;
in response to a determination that at least a portion of the downstream data is churned, dechurning the decrypted portion of the downstream data from the optical line termination, wherein in response to a determination that the downstream data is not churned, the decrypted downstream data is not dechurned; and
encrypting upstream data prior to transmission to the optical line termination.

8. The method as in claim 7, wherein the digital decryption algorithm is a DES decryption algorithm, a 3DES decryption algorithm, an AES decryption algorithm, or an RSA decryption algorithm.

9. The method as in claim 7, wherein the portion of the downstream data includes a data payload of at least one downstream ATM cell.

10. In an optical network termination that is in optical communication with an optical line termination and operably coupled to at least one subscriber device, a method comprising the steps of:
receiving downstream data from a deframer module based on an associated ATM Over Passive Optical Network (APON) identifier;
dechurning digitally encrypted, churned portion of the downstream data from the optical line termination, where dechurning includes sending a signal indicating whether at least a portion of the received downstream data being dechurned are encrypted;
decrypting, in response to a determination that at least a portion of the dechurned data is also encrypted, the dechurned portion of the downstream data using a digital decryption algorithm; and
encrypting upstream data prior to transmission to the optical line termination.

11. The method as in claim 10, wherein the digital decryption algorithm is a DES decryption algorithm, a 3DES decryption algorithm, an AES decryption algorithm, or an RSA decryption algorithm.

12. The method as in claim 10, wherein the portion of the downstream data includes a data payload of at least one downstream ATM cell.

13. A system comprising:
an optical line termination being adapted to transmit, via a passive optical network, downstream data, wherein at least a portion of the downstream data is digitally encrypted and churned; and
an optical network termination in optical communication with the optical line termination via the passive optical network, the optical network termination being adapted to:
dechurn the portion of downstream data, where dechurning includes sending a signal indicating whether at least a portion of the received downstream data being dechurned are encrypted, wherein the downstream data is received from a deframer module based on an associated ATM Over Passive Optical Network (APON) identifier; and
decrypt, in response to a determination that at least a portion of the dechurned data is also encrypted, the portion of downstream data, wherein upstream data is encrypted prior to transmission to the optical line termination.

14. The system as in claim 13, wherein the optical line termination is further adapted to:
receive encrypted data from a data source; and
churn the encrypted data to generate the encrypted, churned portion of the downstream data.

15. The system as in claim 13, wherein the optical line termination is further adapted to:
receive clear data from a data source;
digitally encrypt the clear data to generate encrypted data; and
churn the encrypted data to generate the encrypted, churned portion of the downstream data.

16. The system as in claim 13, wherein the optical line termination is further adapted to:
receive clear data from a data source;
churn the clear data to generate churned data; and
digitally encrypt the churned data to generate the encrypted, churned portion of the downstream data.

17. The system as in claim 13, wherein the optical network termination is adapted to dechurn the portion prior to decrypting the portion.

18. The system as in claim 13, wherein the optical network termination is adapted to decrypt the portion prior to dechurning the portion.

19. The system as in claim 13, wherein the optical network termination is further adapted to provide the dechurned, decrypted portion of the downstream data to at least one subscriber device operably coupled to the optical network termination.

20. The system as in claim 13, wherein the optical network termination is adapted to decrypt the portion of downstream data using a DES decryption algorithm, a 3DES decryption algorithm, an AES decryption algorithm, or an RSA decryption algorithm.

21. The system as in claim 13, wherein the portion of the downstream data includes a data payload of at least one downstream ATM cell.

22. In an optical network termination that is in optical communication with an optical line termination and operably coupled to at least one subscriber device, non-transitory a computer readable medium, the non-transitory computer readable medium comprising a set of instructions being adapted to manipulate a processor to: decrypt a digitally encrypted, churned portion of downstream data from the optical line termination using a digital decryption algorithm; in response to a determination that at least a portion of the downstream data is churned, dechurn the decrypted portion of the downstream data from the optical line termination, wherein in response to a determination that the downstream data is not churned, the decrypted downstream data is not dechurned, wherein the downstream data is received from a deframer module based on an associated ATM Over Passive Optical Network (APON) identifier; and encrypt upstream data prior to transmission to the optical line termination.

23. The non-transitory computer readable medium as in claim 22, wherein the digital decryption algorithm is a DES decryption algorithm, a 3DES decryption algorithm, an AES decryption algorithm, or an RSA decryption algorithm.

24. The non-transitory computer readable medium as in claim 22, wherein the portion of the downstream data includes a data payload of at least one downstream ATM cell.

25. In an optical network termination that is in optical communication with an optical line termination and operably coupled to at least one subscriber device, a non-transitory computer readable medium, the non-transitory computer readable medium comprising a set of instructions being adapted to manipulate a processor to: dechurn a digitally encrypted, churned portion of downstream data from the optical line termination, where dechurning includes sending a signal indicating whether at least a portion of the received downstream data being dechurned are encrypted, wherein the downstream data is received from a deframer module based on an associated ATM Over Passive Optical Network (APON) identifier;

decrypt, in response to a determination that at least a portion of the dechurned downstream data is also encrypted, the dechurned portion of the downstream data using a digital decryption algorithm; and encrypt upstream data prior to transmission to the optical line termination.

26. The non-transitory computer readable medium as in claim 25, wherein the digital decryption algorithm is a DES decryption algorithm, a 3DES decryption algorithm, an AES decryption algorithm, or an RSA decryption algorithm.

27. The non-transitory computer readable medium as in claim 25, wherein the portion of the downstream data includes a data payload of at least one downstream ATM cell.

\* \* \* \* \*